(12) United States Patent
Black et al.

(10) Patent No.: US 9,744,449 B2
(45) Date of Patent: Aug. 29, 2017

(54) PERIPHERAL DEVICES HAVING DYNAMIC WEIGHT DISTRIBUTION TO CONVEY SENSE OF WEIGHT IN HMD ENVIRONMENTS

(71) Applicant: Sony Interactive Entertainment Inc., Tokyo (JP)

(72) Inventors: Glenn Black, San Mateo, CA (US); Frederick Umminger, Oakland, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 248 days.

(21) Appl. No.: 14/579,839

(22) Filed: Dec. 22, 2014

(65) Prior Publication Data

US 2016/0175702 A1 Jun. 23, 2016

(51) Int. Cl.
- A63F 13/28 (2014.01)
- G06T 19/00 (2011.01)
- G02B 27/01 (2006.01)
- A63F 13/25 (2014.01)
- A63F 13/285 (2014.01)

(52) U.S. Cl.
CPC .............. *A63F 13/28* (2014.09); *A63F 13/25* (2014.09); *A63F 13/285* (2014.09); *G02B 27/0172* (2013.01); *G06T 19/006* (2013.01)

(58) Field of Classification Search
USPC ..................................................... 463/31, 32
See application file for complete search history.

(56) References Cited

U.S. PATENT DOCUMENTS

| 2009/0325699 A1* | 12/2009 | Delgiannidis ........... A63F 13/06 463/32 |
| 2014/0004941 A1* | 1/2014 | Christopher Watson ................. A63F 13/355 3/355 |

FOREIGN PATENT DOCUMENTS

WO WO 2013/134388 A1 9/2013

OTHER PUBLICATIONS

ISR PCT/US2015/062670, dated Mar. 14, 2016, 3 pages.

* cited by examiner

*Primary Examiner* — Pierre E Elisca
(74) *Attorney, Agent, or Firm* — Martine Penilla Group, LLP

(57) ABSTRACT

A system and method of simulating weight of a virtual object in a virtual environment includes receiving a weight adjusting profile in a handheld peripheral device. The weight adjusting profile corresponding to at least one weight characteristic and/or a movement characteristics of the virtual object presented in the virtual environment where the handheld peripheral device represents the virtual object. The handheld peripheral device includes a movable weight. The weight adjusting profile is stored in the handheld peripheral device and a position of the movable weight in the handheld peripheral device is adjusted to correspond to a movement of the virtual object in the virtual environment.

19 Claims, 17 Drawing Sheets

PERIPHERAL DEVICES HAVING DYNAMIC WEIGHT DISTRIBUTION TO CONVEY SENSE OF WEIGHT IN HMD ENVIRONMENTS

TECHNICAL FIELD

The present invention relates generally to virtual environments, and more particularly, to methods and systems for simulating different virtual object weights.

DESCRIPTION OF RELATED ART

One of the rapidly growing technologies in the field of human-computer interaction is various head-mounted or head-coupled displays, which may be worn on a user's head and which have one or two displays in front of the one or two user eyes. This type of display has multiple commercial applications involving simulation of virtual reality including video games, medicine, sport training, entertainment applications, and so forth. In the gaming field, these displays may be used, for example, to render three-dimensional (3D) virtual game worlds.

SUMMARY

Broadly speaking, the present invention fills these needs by providing a system, method and apparatus for simulating different weights of a virtual object in the virtual environment. It should be appreciated that the present invention can be implemented in numerous ways, including as a process, an apparatus, a system, or a device. Several inventive embodiments of the present invention are described below.

One embodiment provides a method of simulating weight of a virtual object in a virtual environment. The method includes receiving a weight adjusting profile in a handheld peripheral device. The weight adjusting profile corresponding to at least one weight characteristic and/or movement characteristics of the virtual object presented in the virtual environment where the handheld peripheral device represents the virtual object. The handheld peripheral device includes a movable weight. The weight adjusting profile may be stored in the handheld peripheral device or in the computer. A position of the movable weight in the handheld peripheral device is adjusted to correspond to a movement of the virtual object in the virtual environment.

The movable weight simulates the change in weight of the virtual object as felt by the user when the user moves the virtual object corresponding to the peripheral device. The movable weight may simulate a change in weight, a change in balance, change in acceleration/deceleration of movement and a change in momentum of the virtual object corresponding to the peripheral device.

A game controller may be included in the peripheral device. The peripheral device may include a movement controller for controlling movement of the movable weight according to data received from the computer accessing the game, e.g., a game console. The peripheral device may include at least one inertial sensor to detect movement of the peripheral device or other methods and systems may be used to track the movement of the peripheral device such as a camera tracking the peripheral device. The movable weight may move in multiple directions within the peripheral device. The movable weight may move along a length of the peripheral device and/or laterally across a width of the peripheral device. The movable weight may be rotated and oscillated.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for simulating different weights of a virtual object in the virtual environment will now be described. It will be apparent to those skilled in the art that the present invention may be practiced without some or all of the specific details set forth herein.

One approach to simulating different weights of a virtual object is to use a physical object that includes a movable weight. The weight may move within the physical object to correspond to movements of the virtual object. The movable weight may shift along the length and/or across a width of the physical object to change the center of gravity, increase or decrease torque felt by the user, or momentum of the physical object to simulate changes in weight, momentum, torque, change in center of gravity of the virtual object to correspond to virtual movements of the virtual object. By way of example, physical object is club shaped and represents a virtual sword. The movable weight may be shifted along a length of the physical object to correspond with the variation in weight felt by the user as the virtual sword is lifted and rotated from a horizontal orientation to a vertical orientation.

The movable weight may also rotate, oscillate and vibrate to correspond to the virtual movements of the virtual object. In another example, the weight may be shifted in the physical object to simulate a recoil action of firing a virtual rifle and a series of relatively small weight reductions as the virtual ammunition is expended from the rifle.

Figure 1:
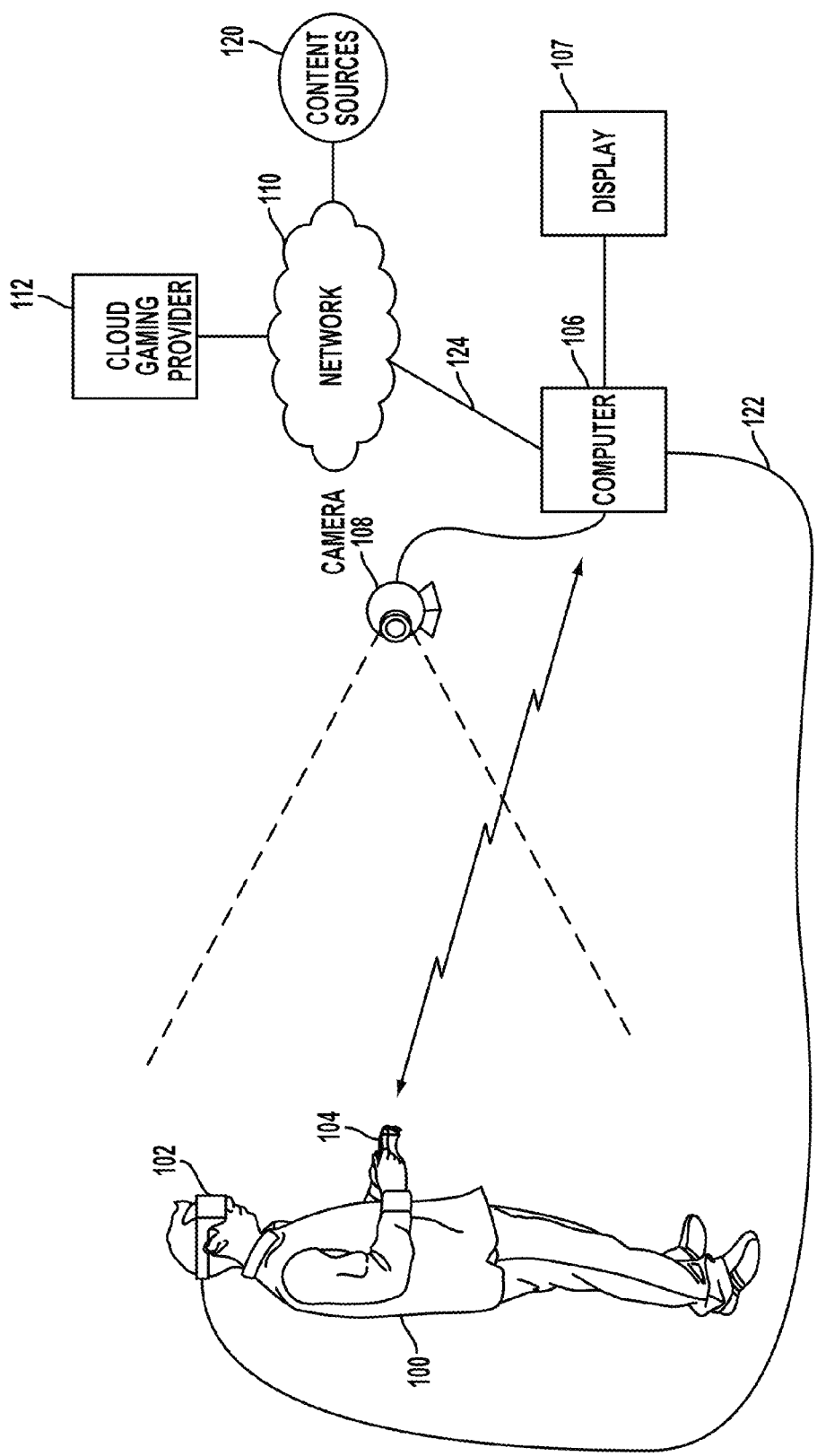
FIG. 1 illustrates a system for interactive gameplay of a video game, in accordance with an embodiment of the invention.

FIG. 1 illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 is configured to provide an immersive experience to the user by virtue of its provision of display mechanisms (e.g., optics and display screens) in close proximity to the user's eyes and the format of the content delivered to the HMD. In one example, the HMD 102 may provide display regions to each of the user's eyes which occupy large portions or even the entirety of the field of view of the user.

In one embodiment, the HMD 102 may be connected to a computer 106. The connection 122 to computer 106 may be wired or wireless. The computer 106 may be any general or special purpose computer, including but not limited to, a gaming console, personal computer, laptop, tablet computer, mobile device, cellular phone, tablet, thin client, set-top box, media streaming device, etc. In some embodiments, the HMD 102 may connect directly to a network 110 such as the internet, which may allow for cloud gaming without the need for a separate local computer. In one embodiment, the computer 106 may be configured to execute a video game (and other digital content), and output the video and audio from the video game for rendering by the HMD 102. The computer 106 is also referred to herein as a client system 106, which in one example is a video game console.

The computer 106 may, in some embodiments, be a local or remote computer, and the computer may run emulation software. In a cloud gaming embodiment, the computer 106 is remote and may be represented by multiple computing services that may be virtualized in data centers, wherein game systems/logic may be virtualized and distributed to user over a network 110.

The user 100 may operate a controller 104 to provide input for the video game. In one example, a camera 108 may be configured to capture image of the interactive environment in which the user 100 is located. These captured images may be analyzed to determine the location and movements of the user 100, the HMD 102, and the controller 104. In one embodiment, the controller 104 includes a light (or lights) which may be tracked to determine its location and orientation. Additionally, as described in further detail below, the HMD 102 may include one or more lights 200A-K which may be tracked as markers to determine the location and orientation of the HMD 102 in substantial real-time during game play.

The camera 108 may include one or more microphones to capture sound from the interactive environment. Sound captured by a microphone array may be processed to identify the location of a sound source. Sound from an identified location may be selectively utilized or processed to the exclusion of other sounds not from the identified location. Furthermore, the camera 108 may be defined to include multiple image capture devices (e.g. stereoscopic pair of cameras), an IR camera, a depth camera, and combinations thereof.

In some embodiments, computer 106 may execute games locally on the processing hardware of the computer 106. The games or content may be obtained in any form, such as physical media form (e.g., digital discs, tapes, cards, thumb drives, solid state chips or cards, etc.) or by way of download from the Internet, via network 110. In another embodiment, the computer 106 functions as a client in communication over a network with a cloud gaming provider 112. The cloud gaming provider 112 may maintain and execute the video game being played by the user 100. The computer 106 transmits inputs from the HMD 102, the controller 104 and the camera 108, to the cloud gaming provider 112, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections 124 to the network by the HMD 102, controller 104, and camera 108 may be wired or wireless. In some embodiments, content executed on the HMD 102 or displayable on a display 107, may be obtained from any content source 120. Example content sources may include, for instance, internet websites that provide downloadable content and/or streaming content. In some examples, the content may include any type of multimedia content, such as movies, games, static/dynamic content, pictures, social media content, social media websites, etc.

As will be described below in more detail, a user 100 may be playing a game on the HMD 102, where such content is immersive 3D interactive content. The content on the HMD 102, while the player is playing, may be shared to a display 107. In one embodiment, the content shared to the display 107 may allow other users proximate to the user 100 or remote to watch along with the user's play. In still further embodiments, another user viewing the game play of user 100 on the display 107 may participate interactively with player 100. For example, a user viewing the game play on the display 107 may control characters in the game scene, provide feedback, provide social interaction, and/or provide comments (via text, via voice, via actions, via gestures, etc.,) which enables users that are not wearing the HMD 102 to socially interact with user 100, the game play, or content being rendered in the HMD 102.

Figure 2:
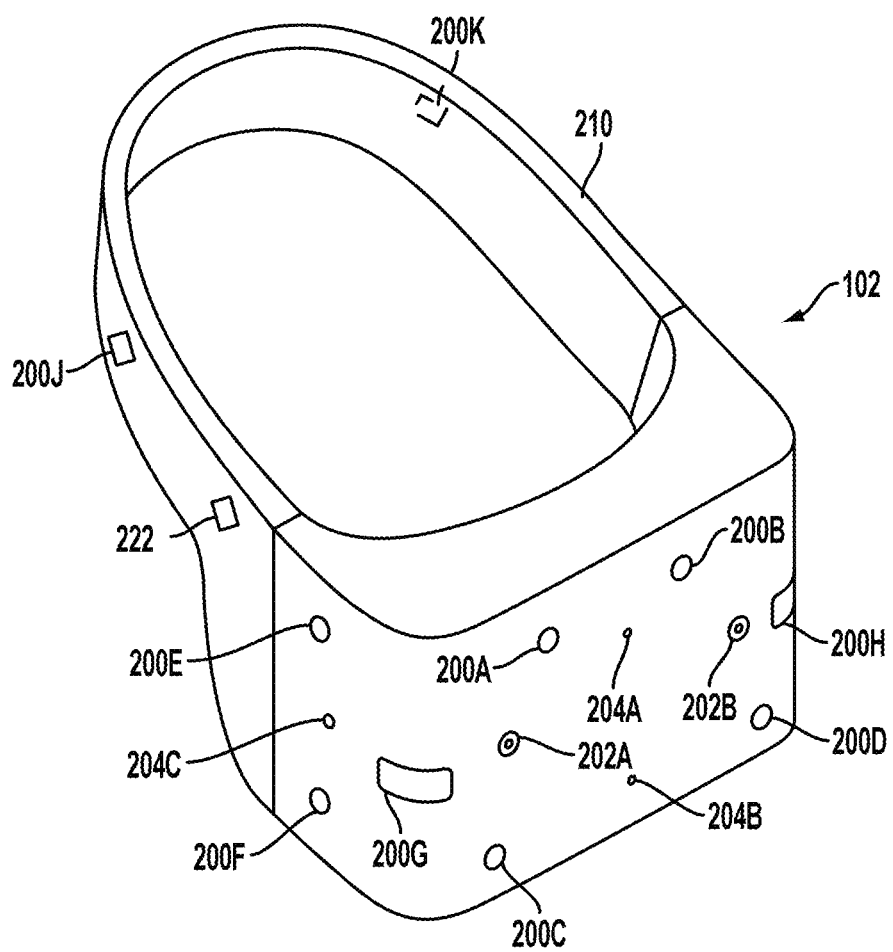
FIG. 2 illustrates a head mounted display, in accordance with an embodiment of the invention.

FIG. 2 illustrates a HMD 102, in accordance with an embodiment of the invention. As shown, the HMD 102 includes a plurality of lights 200A-K (e.g., where 200K and 200J are located toward the rear or backside of the HMD headband 210). Each of these lights may be configured to have specific shapes and/or positions, and may be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights may be identified in captured images of an interactive environment in which a user uses the HMD 102.

Based on identification and tracking of the lights, the location and orientation of the HMD 102 in the interactive environment may be determined. It will further be appreciated that some of the lights 200A-K may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device. In some embodiments, inertial sensors are disposed in the HMD 102, which provide feedback regarding positioning, without the need for lights 200A-K. In some embodiments, the lights and inertial sensors work together, to enable mixing and selection of position/motion data.

In one embodiment, the lights may be configured to indicate a current status of the HMD 102 to others in the vicinity. For example, some or all of the lights 200A-K may be configured to have a certain color arrangement, intensity arrangement, be configured to blink, have a certain on/off configuration, or other arrangement indicating a current status of the HMD 102. By way of example, the lights 200A-K may be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights 200A-K might also be configured to indicate relative intensity levels of gameplay. For example, the intensity of lights 200A-K, or a rate of blinking, may increase when the intensity of gameplay increases.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones 204A-C, sound from each of the microphones may be processed to determine the location of the sound's source. This information may be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment may be captured from the perspective of the HMD 102. Such video may be presented to the user to provide the user with a "video see-through" ability while wearing the HMD 102. That is, though the user cannot see through the HMD 102 in a strict sense, the video captured by the image capture devices 202A and 202B may nonetheless provide a functional equivalent of being able to see the environment external to the HMD 102 as if looking through the HMD 102.

Such video may be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras or a single camera may be installed on the HMD 102, and oriented in any direction. For example, in another embodiment, there may be cameras mounted on the sides of the HMD 102 to provide additional panoramic image capture of the environment.

Figure 3:
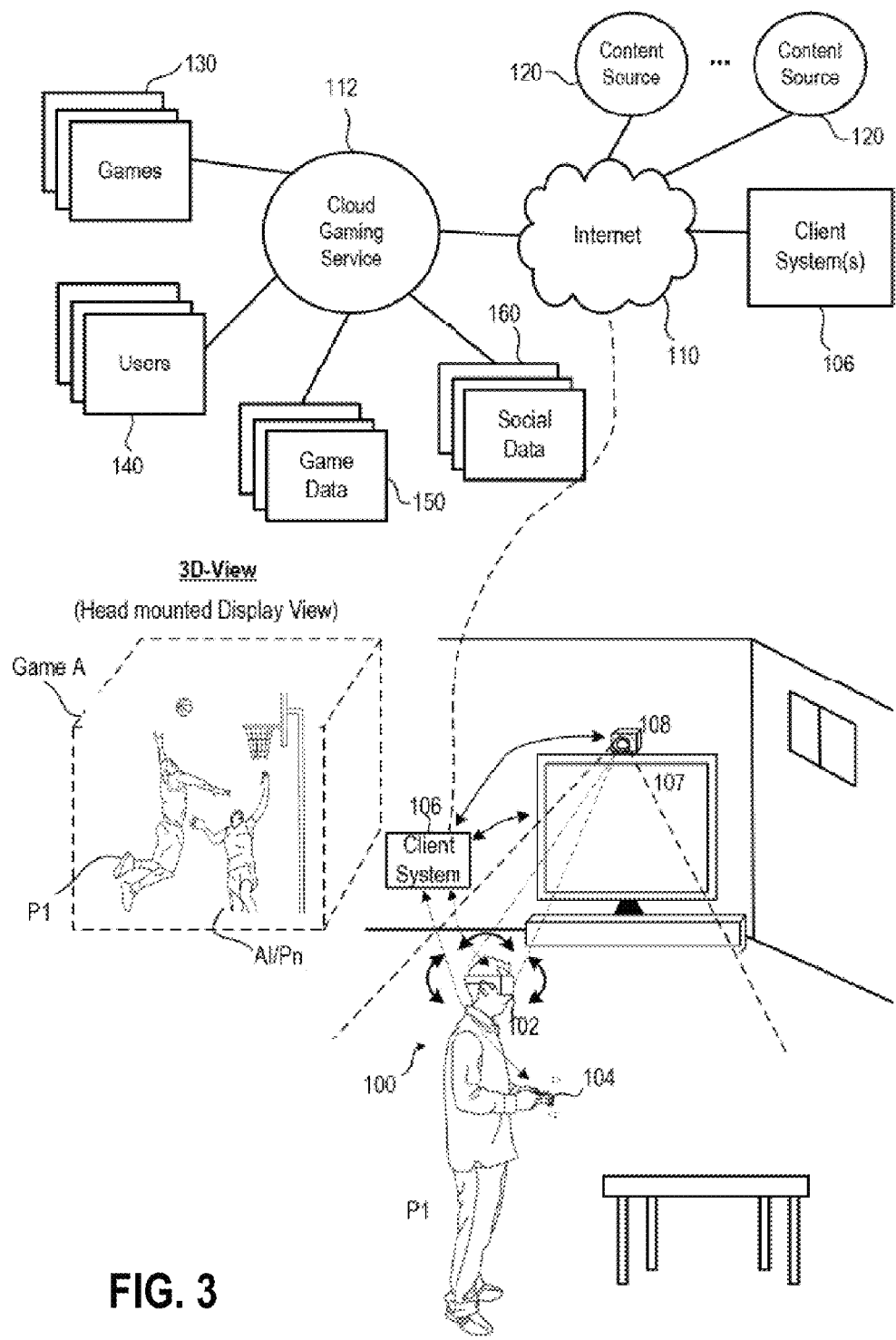
FIG. 3 illustrates one example of gameplay using the client system that is capable of rendering the video game content to the head mounted display, in accordance with an embodiment of the invention.

FIG. 3 illustrates one example of gameplay using the client system 106 that is capable of rendering the video game content to the HMD 102 of user 100. In this illustration, the game content provided to the HMD 102 is in a rich interactive 3-D space. As discussed above, the game content may be downloaded to the client system 106 or may be executed in one embodiment by a cloud processing system. Cloud gaming service 112 may include a database of users 140, which are allowed to access particular games, share experiences with other friends, post comments, and manage their account information.

The cloud gaming service 112 may also store game data 150 for specific users, which may be usable during gameplay, future gameplay, sharing to a social media network, or for storing trophies, awards, status, ranking, etc. Social data 160 may also be managed by cloud gaming service 112. The social data 160 may be managed by a separate social media network, which may be interfaced with cloud gaming service 112 over the Internet 110. Over the Internet 110, any number of client systems 106 may be connected for access to the content and interaction with other users.

Continuing with the example of FIG. 3, the three-dimensional interactive scene viewed in the HMD 102 may include gameplay, such as the characters illustrated in the 3-D view. One character, e.g. P1, may be controlled by the user 100 that is wearing the HMD 102. This example shows a basketball scene between two players, wherein the HMD user 100 is dunking a ball on another character in the 3-D view. The other character may be an AI (artificial intelligence) character of the game, or may be controlled by another user or users (Pn). User 100, who is wearing the HMD 102 is shown moving about in a space of use, wherein the HMD may move around based on the user's head movements and body positions. The camera 108 is shown positioned over a display screen in the room, however, for HMD 102 use, the camera 108 may be placed in any location that may capture images of the HMD 102. As such, the user 100 is shown turned at about 90 degrees from the camera 108 and the display 107, as content rendered in the HMD 102 may be dependent on the direction that the HMD 102 is positioned, from the perspective of the camera 108. Of course, during HMD 102 use, the user 100 will be moving about, turning his head, looking in various directions, as may be needed to take advantage of the dynamic virtual scenes rendered by the HMD.

Figure 4:
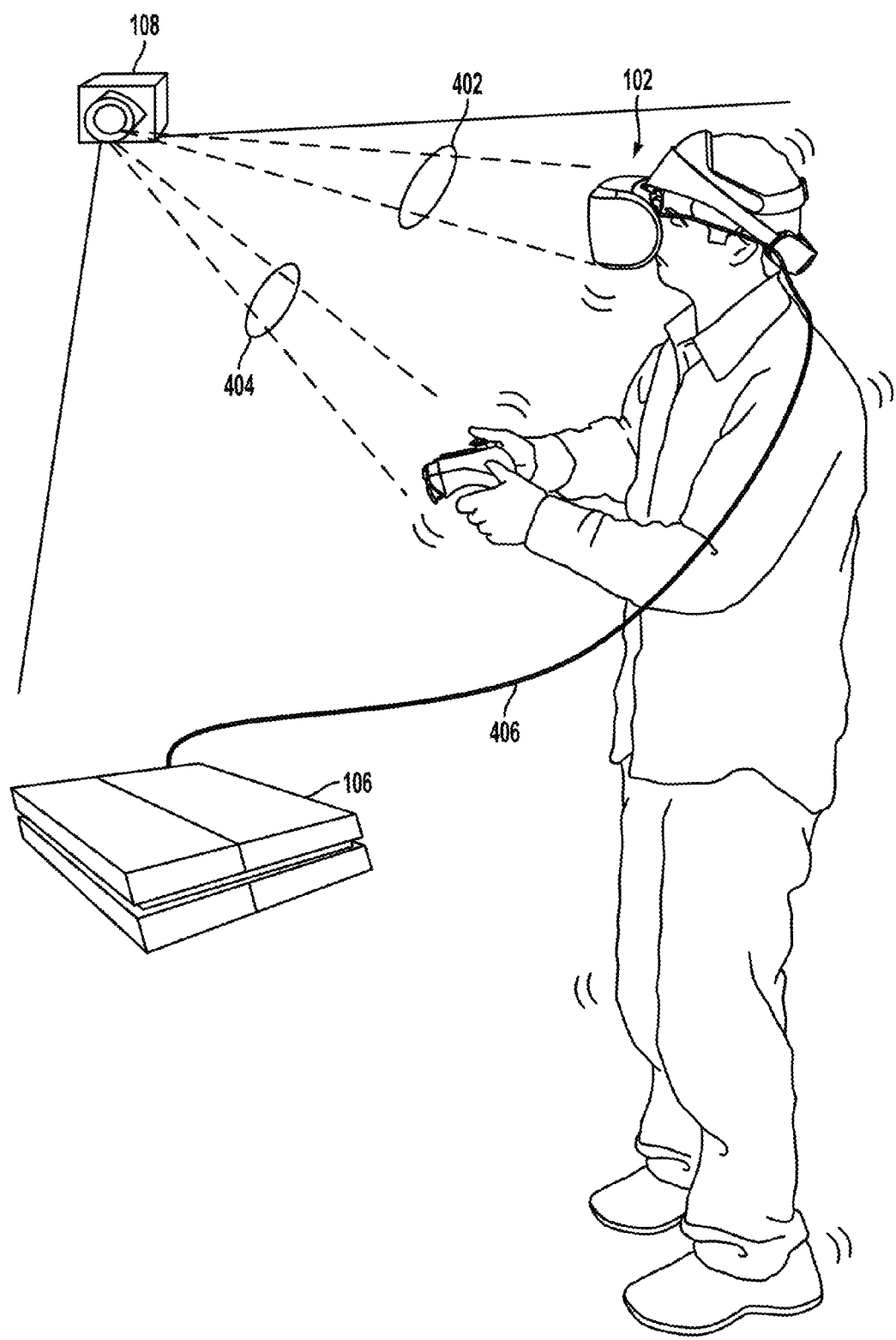
FIG. 4 illustrates a user wearing the head mounted display, during use, in accordance with one embodiment.

FIG. 4 illustrates a user wearing the HMD 102, during use, in accordance with one embodiment. In this example, it is shown that the HMD 102 is tracked 402 using image data obtained from captured video frames by the camera 108. Additionally, it is shown that the controller may also be tracked 404 using image data obtained from captured video frames by the camera 108. Also shown is the configuration where the HMD 102 is connected to the computing system 106 via a cable 406. In one embodiment, the HMD 102 obtains power from the same cable or may connect to another cable. In still another embodiment, the HMD 102 may have a battery that is rechargeable, so as to avoid extra power cords.

Figure 5A:
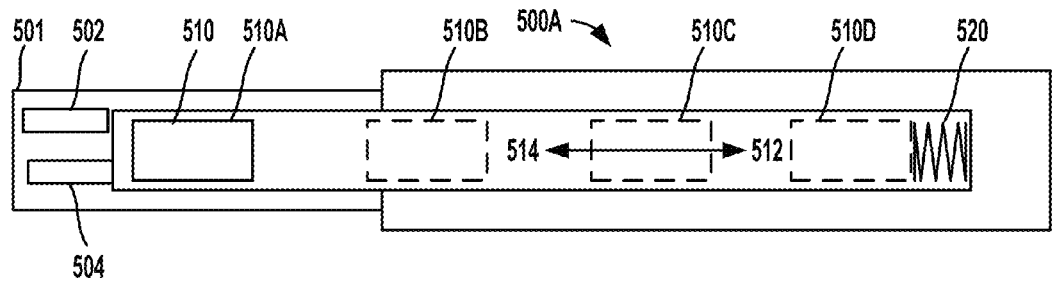
FIGS. 5A-C are simplified diagrams of handheld peripheral devices with a movable weight, in accordance with an embodiment of the invention.
Figure 5B:
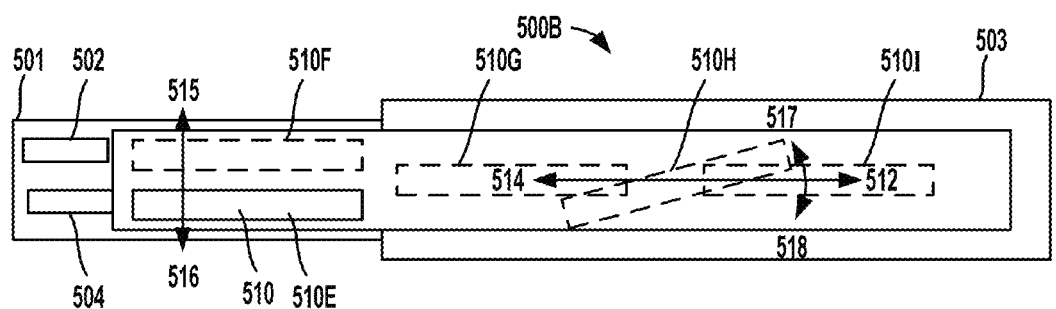
Figure 5C:
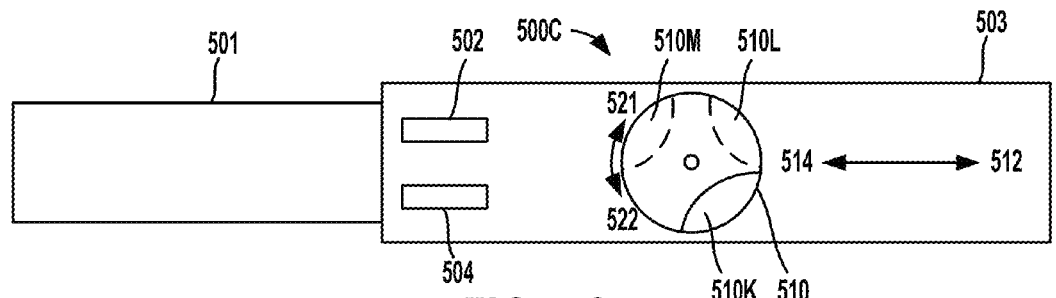

FIGS. 5A-C are simplified diagrams of handheld peripheral devices 500A-C with a movable weight 510, in accordance with an embodiment of the invention. The handheld peripheral devices 500A-C are coupled to a game console or client computer 106 via a wired or a wireless connection. The handheld peripheral devices 500A-C include a housing 503. The handheld peripheral devices 500A-C include a movement controller 502 that is coupled to a move mechanism 504 capable of moving the movable weight 510 within a chamber 505 within the housing 503. The movement controller 502 receives a weight movement profile and other movement instructions from the computer 106. The movement controller 502 includes a memory for storing the movement profile and other movement instructions received from the computer 106. The movement controller 502 processes the movement profile and other instructions to corresponding weight movement instructions and outputs the weight movement instructions to the movement device 504. The move mechanism 504 receives the weight movement instructions and moves the weight 510 in a corresponding direction and at a corresponding rate of movement. Moving the weight changes the weight distribution of the peripheral device 500A-C to correlate the weight distribution of the peripheral device to a movement of a corresponding virtual object in a virtual reality scene. The weight move mechanism 504 may include a motor, an electromagnet, a pump, a pressurized or compressed gas source, one or more memory metals, electroactive polymers, phase changing materials and other chemical processes can also provide suitable movement mechanisms and any other suitable mechanism for moving the weight 510. The weight move mechanism 504 may also record a weight position feedback signal and output the weight position feedback device that monitors the position of the weight 510. The weight position feedback device outputs a weight position feedback signal to the movement controller 502. The handheld peripheral devices 500A-C may include a handle or grip area 501 for the user to hold the handheld peripheral devices during use.

As noted above, one specific use of such a peripheral is to enable movement of the weight 510 during interactive use of an HMD 102. As the content changes in the HMD 102, the changes are correlated to the movement of the weight 510. For instance, if a user sees himself holding an object in the virtual environment depicted in the HMD 102, the physics that would be present in the real world may be converted to move the position of the weight 510 and/or change direction and rate of movement of the weight.

The movable weight 510 may be moved in various directions, velocities, movement cycle rates, revolutions per minute, oscillations, etc. to change the perceived weight of the peripheral device. The movable weight 510 may move very slowly (e.g., about 1.0 mm per second) over the course of several seconds to provide the perceived feeling of a gradual weight change of the peripheral device. The movable weight 510 may be moved very rapidly (e.g., up to about 1000 meters per second) so as to simulate a discharge of a firearm or a recoil of a discharged firearm. The movable weight 510 may move at rates of between about 1.0 mm per second up to about 1000 meters per second as may be needed to simulate the weight change corresponding to the movement characteristics of the virtual object represented by the peripheral device.

The movable weight 510 may be oscillated between two or more locations within the handheld peripheral device to simulate a vibration or some other movement user perceived feeling. The movable weight 510 may be rotated to simulate the weight change corresponding to the movement characteristics of the virtual object represented by the peripheral device. The movable weight 510 may be spun to a relatively high speed to generate gyroscopic forces, such as angular momentum and gyroscopic precession, to simulate the weight change and/or resistance to movement corresponding to the movement characteristics of the virtual object represented by the peripheral device.

As shown in FIG. 5A, the handheld peripheral device 500A may represent a bat, a club, a sword, a spear or other implement or object. The handheld peripheral device 500A includes a movable weight 510 that may move through positions 510A-D and positions between, along a length of the handheld peripheral device in directions 512, 514. In some embodiments, the lengthy may be curved or include one or more turns or segments. The handheld peripheral device 500 may also include a spring 520 for stopping and/or returning the movable weight 510 in position 510D. The movable weight 510 may oscillate in directions 512, 514. As the movable weight 510 moves away from the handle portion 501, the weight has an increased leverage on the handle. As a result, the handheld peripheral device 500A seems to increase in weight to the user's feeling as the movable weight 510 moves in direction 512, away from the handle 501. Conversely, the handheld peripheral device 500A seems to decrease in weight to the user as the movable weight 510 moves closer to the handle 501 in direction 514.

As shown in FIG. 5B, the handheld peripheral device 500B may represent a bat, a club, a sword, a spear or other implement or object. The handheld peripheral device 500B includes a movable weight 510 that may move through positions 510E-F, side to side in the handheld peripheral device in directions 515, 516. The handheld peripheral device 500B. When the movable weight 510 moves from side to side, in directions 515, 516, the weight and balance of the handheld peripheral device may give a varying feeling to the user.

The movable weight 510 may also move through positions 510G-I, lengthwise in the handheld peripheral device 500B in directions 512, 514. The movable weight 510 may also pivot through positions 510H and 510J in directions 517, 518. Moving the movable weight 510 in directions 512, 514, 517, 518 varies the feeling of weight and movement to the user.

As shown in FIG. 5C, the handheld peripheral device 500C may represent a bat, a club, a sword, a spear or other implement or object. The handheld peripheral device 500C includes a movable weight 510 that may move lengthwise along the handheld peripheral device in directions 512, 514, and may rotate through positions 510K-M in directions 521, 522. The movable weight 510 may also spin in directions 521, 522 to develop gyroscopic forces to further simulate variations in weight and resistance to the user's motion of the handheld peripheral device 500C.

Figure 6:
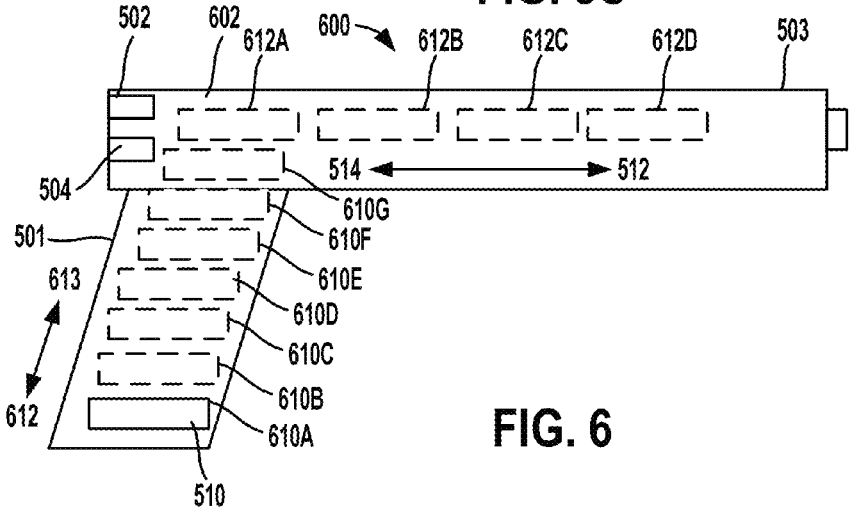
FIG. 6 is a simplified diagram of another handheld peripheral device with a movable weight, in accordance with an embodiment of the invention.

FIG. 6 is a simplified diagram of a handheld peripheral device 600 with a movable weight 510, in accordance with an embodiment of the invention. The handheld peripheral device 600 may represent a virtual pistol or hammer or similar virtual object. The handheld peripheral device 600 includes movable weight that may move in directions 612, 613 vertically within the handle portion 501 such as to simulate a weight decrease as ammunition is expended in the virtual pistol. Similarly, the movable weight 520 may move in directions 512, 514 to vary the weight and balance feel to the user. Moving the movable weight 510 in a rapid, reciprocating movement in directions 512, 514, may simulate recoil handheld peripheral device 600 to correspond to a virtual recoil of discharging a virtual pistol.

Figure 7:
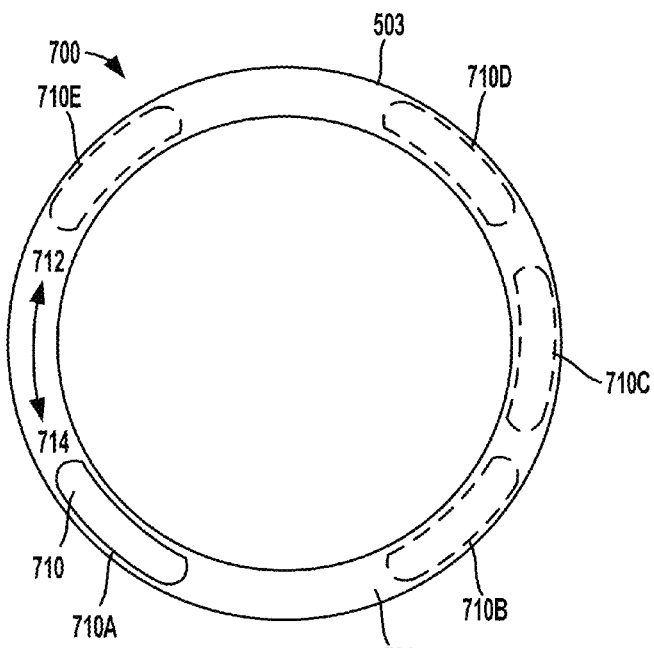
FIG. 7 is a simplified diagram of another handheld peripheral device with a movable weight, in accordance with an embodiment of the invention.

FIG. 7 is a simplified diagram of a handheld peripheral device 700 with a movable weight 710, in accordance with an embodiment of the invention. The handheld peripheral device 700 is substantially circular, oval or ellipsoid shaped. The handheld peripheral device 700 could represent a virtual steering wheel or a virtual discus or other substantially circular, oval or ellipsoid shaped virtual object. The handheld peripheral device 700 includes a curved path 701. The movable weight 710 may move in directions 712, 714 along the curved path though positions 710A-E.

Figure 8:
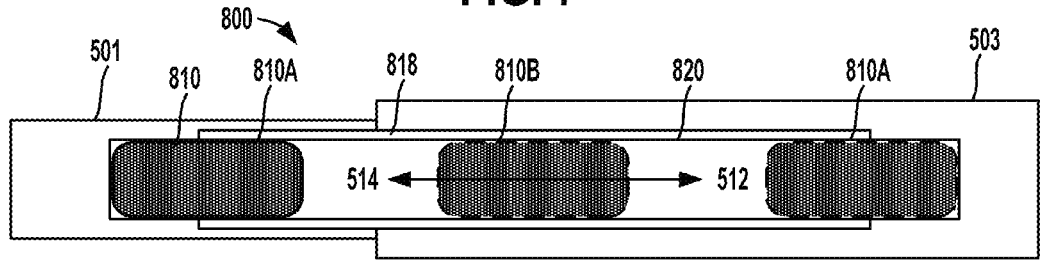
FIG. 8 is a simplified diagram of a handheld peripheral device with a movable, magnetic mass, in accordance with an embodiment of the invention.

FIG. 8 is a simplified diagram of a handheld peripheral device 800 with a movable, magnetic mass 810, in accordance with an embodiment of the invention. The handheld peripheral device 800 includes a channel 820 which the movable, magnetic mass 810 may move. The channel 820 may include electromagnetic coils 818 to move the movable, magnetic mass 810 in direction 512, 514, through positions 810A-C. The movable, magnetic mass 810 may be a magnet or other magnetic material such as an iron or nickel containing mass.

Figure 9:
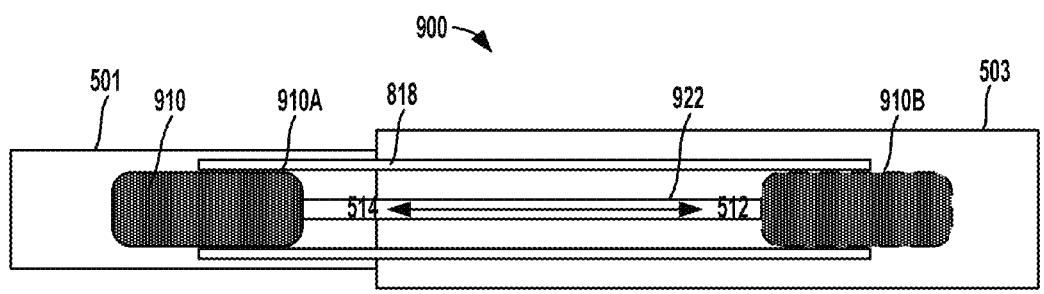
FIG. 9 is a simplified diagram of a handheld peripheral device with a movable fluid or liquid mass, in accordance with an embodiment of the invention.

FIG. 9 is a simplified diagram of a handheld peripheral device 900 with a movable fluid or liquid mass 910, in accordance with an embodiment of the invention. The movable, fluid or liquid mass 910 may be transferred among one or more reservoirs 910A, 910B to provide movable weight feeling to the user. It should be noted that more than two reservoirs 910A, 910B may be included. The movable fluid or liquid mass 910 may include liquids such as oil or water and fluids such as sand, pellets or ferromagnetic fluids that may flow between the reservoirs 910A, 910B. The movable fluid or liquid mass 910 may be moved by pumping such as constricting reservoir 910A to cause the fluid or liquid to flow through the channel 922 to reservoir 910B. Alternatively or additionally, reducing a pressure in reservoir 910B may cause the fluid or liquid to move from reservoir 910A to reservoir 910B. Ferromagnetic fluids may be drawn between the reservoirs 910A, 910B using electromagnetic forces.

Figure 10:
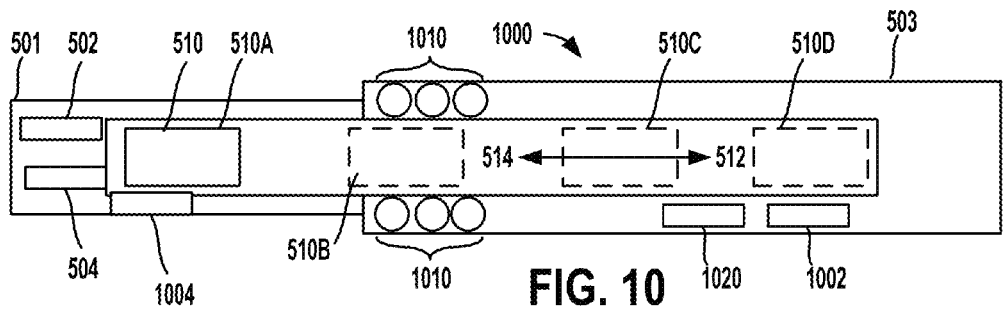
FIG. 10 is a simplified schematic diagram of another handheld peripheral device, in accordance with an embodiment of the invention.

FIG. 10 is a simplified schematic diagram of a handheld peripheral device 1000, in accordance with an embodiment of the invention. The handheld peripheral device 1000 is substantially similar to the handheld peripheral devices 500A-900 described above and the added components described herein could also be included in the handheld peripheral devices described above. The handheld peripheral device 1000 includes multiple control buttons 1010 for operating the controls. The handheld peripheral device 1000 also includes the movement controller 502 and the move mechanism 504 capable of moving the movable weight 510. The move mechanism 504 may include a motor, a hydraulic/pneumatic system 1004, an electromagnetic coil and other systems and combinations thereof, capable of moving the movable weight within the peripheral device.

The handheld peripheral device 1000 also includes a communication link 1020 providing a data link to and from the handheld peripheral device to and from the computer 106 for delivering motion information and control information to and from the computer. The handheld peripheral device 1000 may also include one or more lights or other trackable features that allow one or more cameras to track the motion of the handheld peripheral device. The handheld peripheral device 1000 may also include inertial sensors 1002 such as accelerometers, magnetometers and/or gyroscopes capable of detecting motion of the handheld peripheral device and communicating that motion information to the movement controller 502 and the computer 106 or directly to the HMD 102.

In another embodiment, peripheral devices may be provided with a basic construction that includes a housing, the weight(s), weight move mechanism and weight movement controller. In this configuration, the peripheral device is coupled to a game controller, which has communication logic for communicating input to computer 106 and receiving input from the computer. The game controller has a data port that is connected to a port on the peripheral device, which enables the game controller to activate the movement of the weight in response to data received from the computer 106, based in part on the content being interpreted with and displayed in the HMD 102.

In another embodiment, the weight 510 can be at least partially enclosed within a chamber in the housing. In yet another embodiment, the weight 510 could be placed externally from the housing. By way of example, the weight can be coupled to the weight move mechanism through an opening in the housing and the weight move mechanism can move the weight in various directions outside the housing.

FIGS. 11-14 are simplified schematic diagrams of handheld peripheral devices 1100-1400 configured to work with game controllers 1130, 1330, in accordance with embodiments of the invention. The game controllers 1130, 1330 include control buttons and the communication link 1020. The game controllers 1130, 1330 may optionally include the movement controller 502 and the inertial sensors 1002. One or more of the control buttons on the game controller 1130, 1330 may be coupled to the control buttons 1010 of the handheld peripheral device to allow the handheld peripheral device control buttons to be used instead of or in addition to the control button on the game controller.

Figure 11:
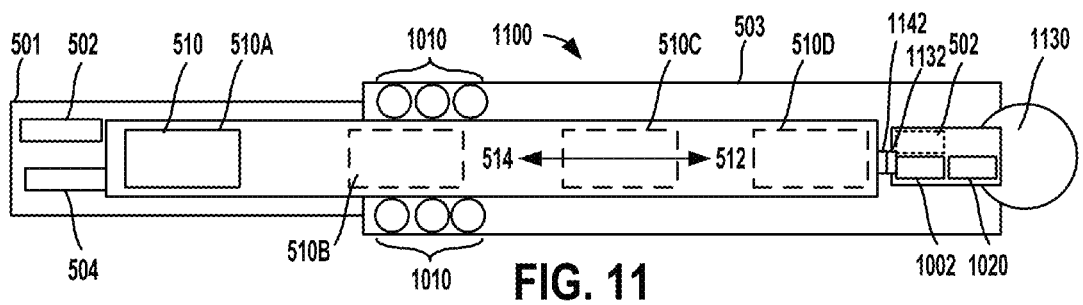
FIGS. 11-14 are simplified schematic diagrams of handheld peripheral devices configured to work with game controllers, in accordance with an embodiment of the invention.

Referring to FIG. 11, the handheld peripheral device 1100 is substantially similar to the handheld peripheral device 1000 of FIG. 10, above. However, the handheld peripheral device 1100 accommodates and couples to a game controller 1130. The game controller 1130 may include the movement controller 502 and inertial sensors 1002, so that these components are not duplicated in the handheld peripheral device 1100. Therefore, the communication link 1020 and other electronics for receiving input that is communicated to the computer 106 and for receiving data and commands from the computer 106, depending on the content being rendered and provided to the HMD 102. The game controller 1130 includes a data port 1132 that is coupled to a corresponding data port 1142 on the peripheral device 1100. The data port 1132 allows the game controller 1130 to receive control inputs from the peripheral device such as user selection of one or more buttons 1010. The data port 1132 allows the game controller 1130 to communicate data to the peripheral device 1100 such as data weight/motion profile received from the computer 106.

Figure 12:
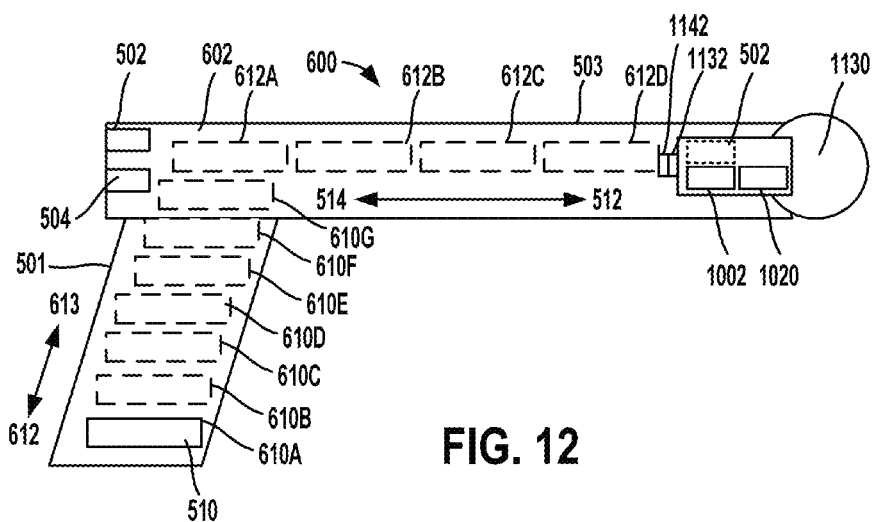

Referring to FIG. 12, the handheld peripheral device 1200 is substantially similar to the handheld peripheral device 600 of FIG. 6, above. However, the handheld peripheral device 1200 accommodates and couples to the game controller 1130 to simplify the peripheral device.

Figure 13:
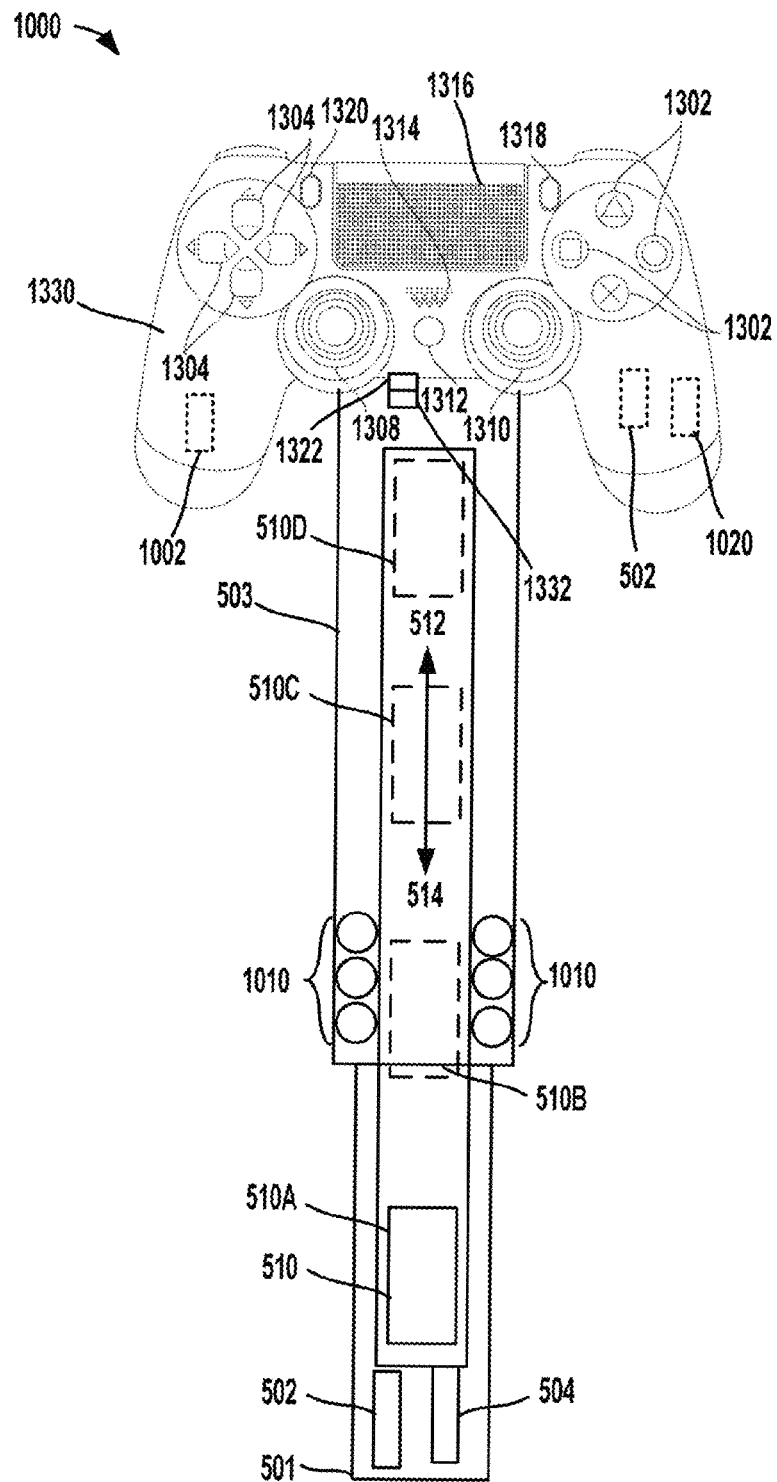

Referring to FIG. 13, the handheld peripheral device 1300 is substantially similar to the handheld peripheral device 1100 of FIG. 11, above. However, the handheld peripheral device 1300 accommodates and couples to a game controller 1330 to simplify the peripheral device. The game controller 1330 may include the movement controller 502 and inertial sensors 1002 so that these components are not also duplicated in the handheld peripheral device 1300. The game controller 1330 may include selection buttons 1302, directional buttons 1304, joy sticks 1308, 1310, a microphone 1314, a touch pad 1316, an options button 1318 and a share button 1320. The game controller 1330 also includes a data port 1322 coupled to the data port 1332 on the peripheral device 1300.

Figure 14:
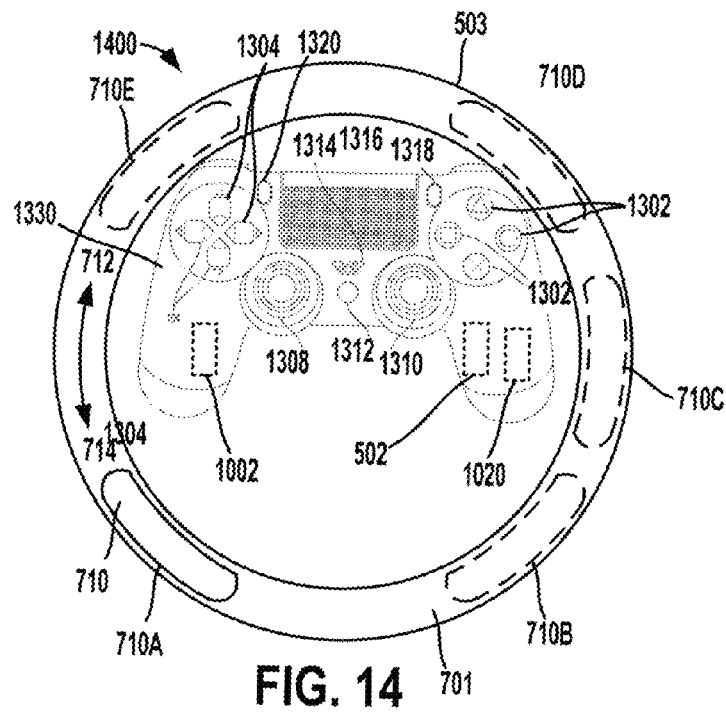

Referring to FIG. 14, the handheld peripheral device 1400 is substantially similar to the handheld peripheral device 700 of FIG. 7, above. However, the handheld peripheral device 1400 accommodates and couples to the game controller 1330 to simplify the peripheral device. The game controller 1330 may include the movement controller 502 and inertial sensors 1002 so that these components are not also duplicated in the handheld peripheral device 1400.

Figure 15:
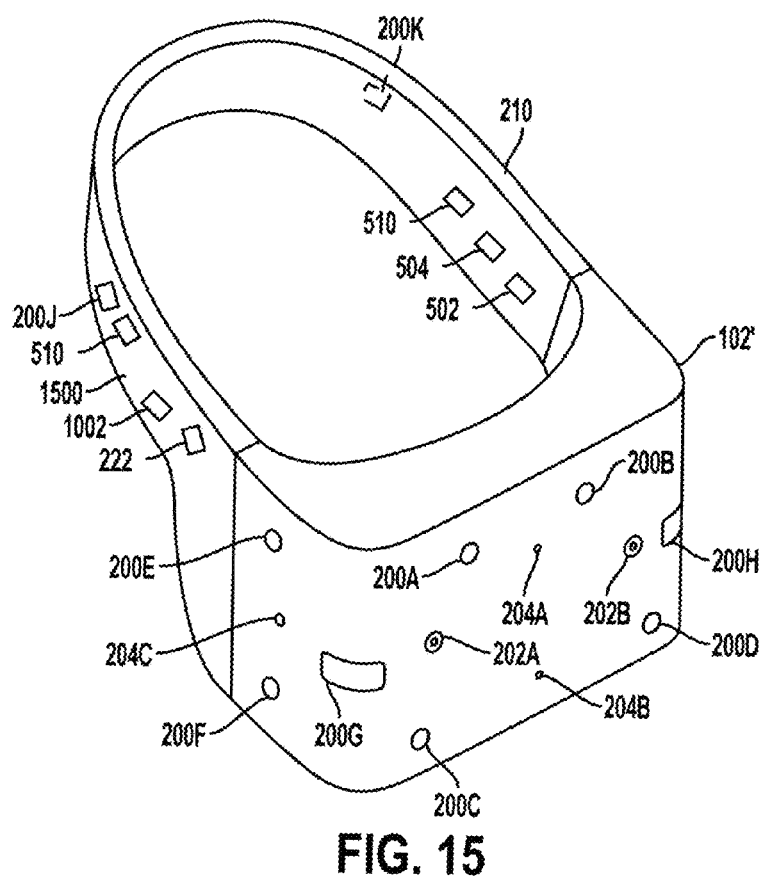
FIG. 15 is a simplified schematic diagram of a headband with a movable weight for a head mounted display, in accordance with an embodiment of the invention.

FIG. 15 is a simplified schematic diagram of a headband 1500 for an HMD 102, in accordance with an embodiment of the invention. The headband 1500 includes the movement controller 502, and the inertial sensors 1002 and the move mechanism 504 capable of moving the movable weight(s) 510. One or more of the movement controller 502, and the inertial sensors 1002 and the move mechanism 504 may be included in the HMD 102'. The movable weight(s) 510 may be moved to provide the physical motion and momentum feedback corresponding to the virtual environment content presented to the user in the HMD 102. In one instance, the user may be participating in a virtual auto race and the weights 510 may shift side to side in synch with and to simulate the lateral acceleration a driver's head would feel as the race car careens around a corner at a high rate of speed. The weights 510 may shift forward and aft in synch with and to simulate the forward acceleration and braking of the race car that would be felt by the race car driver.

Figure 16:
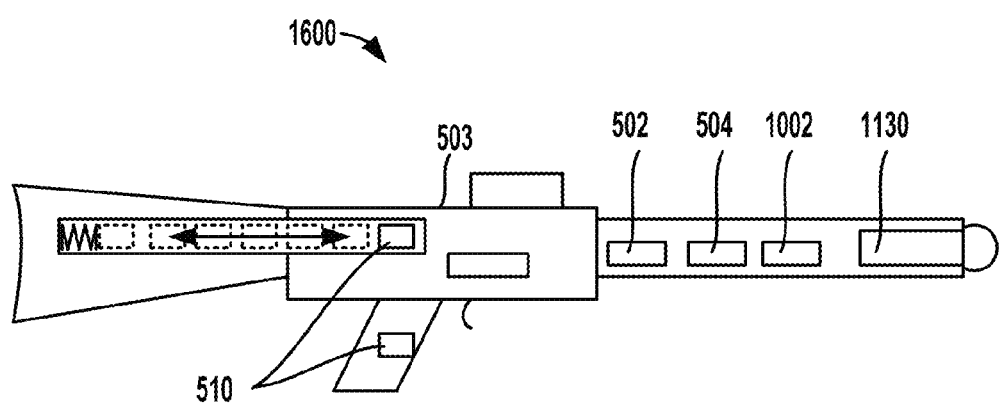
FIG. 16 is a simplified schematic diagram of another handheld peripheral device, in accordance with an embodiment of the invention.

FIG. 16 is a simplified schematic diagram of a handheld peripheral device 1600, in accordance with an embodiment of the invention. The handheld peripheral device 1600 is in the form of a rifle to be used to provide a user the feeling of using a virtual rifle. The handheld peripheral device 1600 includes one or more movable weights 510, the movement controller 502, the inertial sensors 1002 and the move mechanism 504 capable of moving the movable weight(s) 510. The handheld peripheral device 1600 may also be compatible with use of a game controller 1130. The movable weights may move to simulate change in weight as ammunition is expended and/or discharge and recoil of the virtual rifle and/or weight shifting corresponding to how the rifle is held or moved by the user. The movable weight 510 may be moved in synch with and to simulate actions in the virtual environment presented to the user in the HMD 102.

Figure 17:
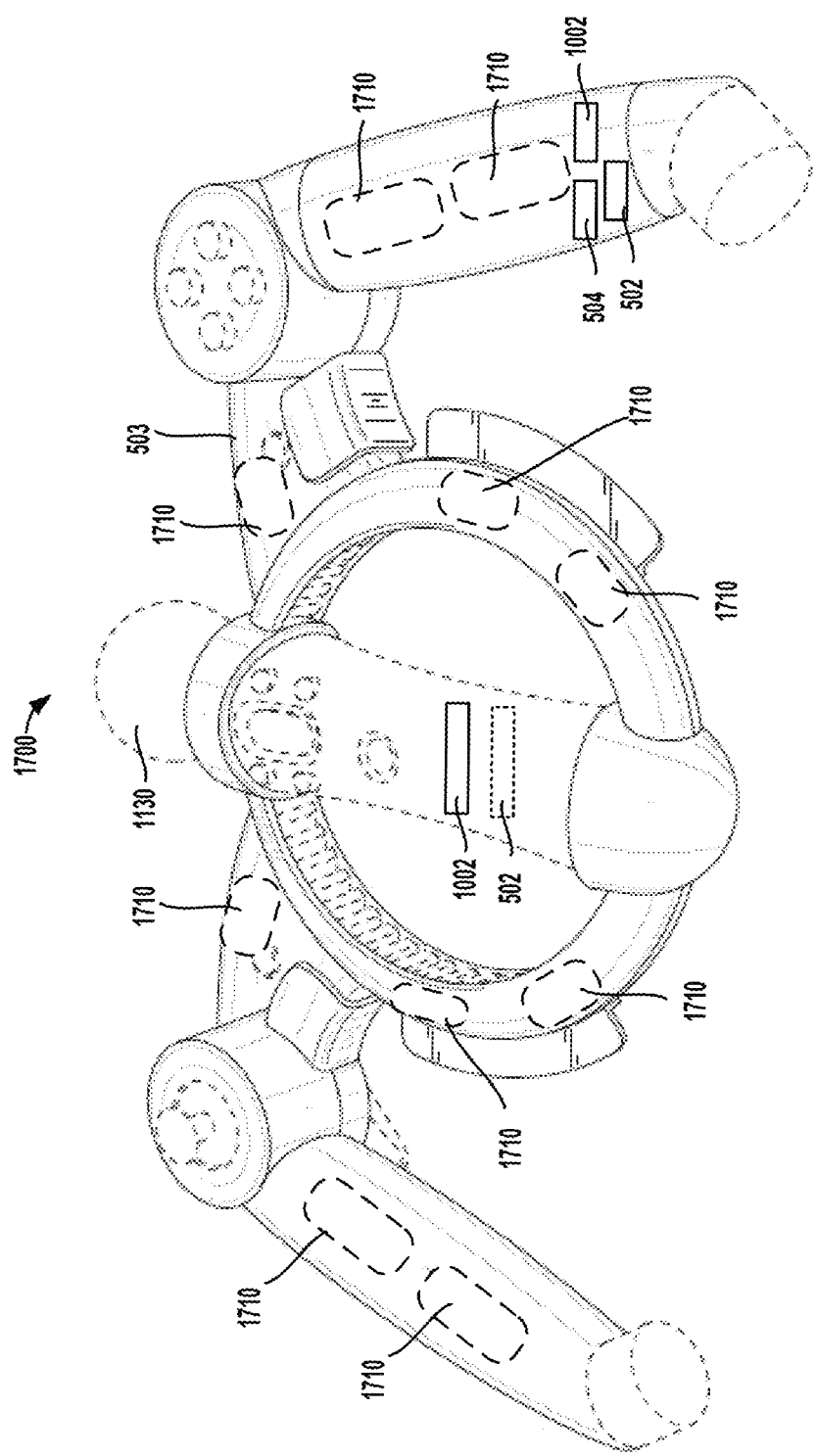
FIG. 17 is a simplified schematic diagram of a handheld peripheral device, in accordance with an embodiment of the invention.

FIG. 17 is a simplified schematic diagram of a handheld peripheral device 1700, in accordance with an embodiment of the invention. The handheld peripheral device 1700 may represent a steering wheel or handlebars or other virtual objects. The handheld peripheral device 1700 has multiple handgrips and multiple locations 1710 for a movable weight. The handheld peripheral device 1700 may be coupled to a game controller 1130. The handheld peripheral device 1700 includes multiple control buttons. At least some of the multiple control buttons are coupled to one or more control buttons on the game controller 1130. The handheld peripheral device 1700 may simulate handlebars of a virtual motorcycle presented to the user in the HMD 102. The movable weights 1710 may be moved to correspond with the virtual motorcycle flying over a virtual motocross jump and landing the virtual motocross jump in the virtual environment.

Figure 18A:
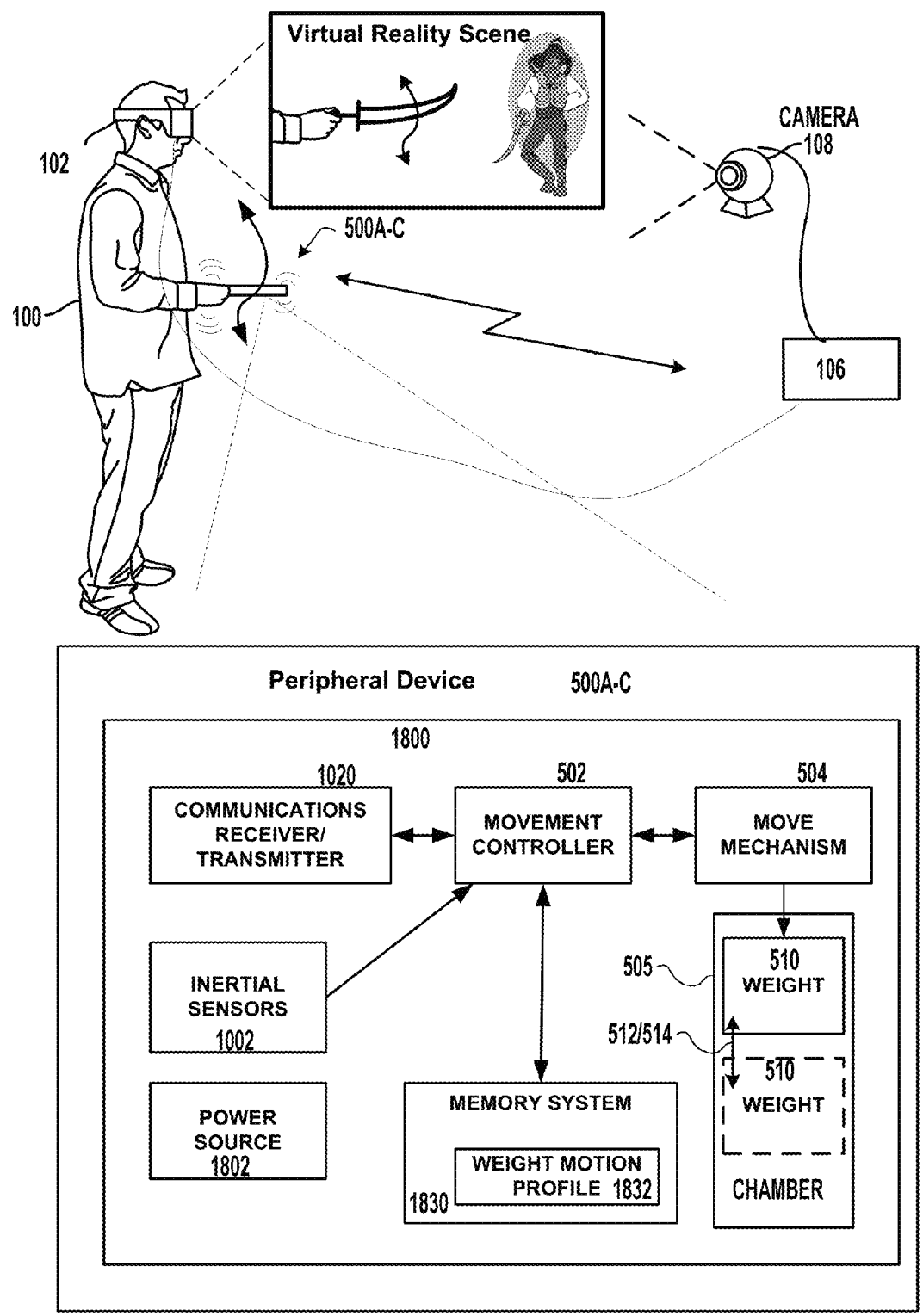
FIG. 18A is a simplified block diagram of a movable weight system, in accordance with an embodiment of the invention.

FIG. 18A is a simplified block diagram of a movable weight system 1800, in accordance with an embodiment of the invention. The movable weight system 1800 may be included in any suitable peripheral device such as peripheral devices 500A-C described above. The movable weight system 1800 includes the movement controller 502, the move mechanism 504, the movable weight 510 within the chamber 505, the inertial sensor 1002 and the communication link 1020 as described above. The movable weight 510 is moved within the chamber 505 to change the weight distribution of the peripheral device as correlated to movements of the virtual object in the virtual reality scene as presented on the head mounted display. Changing the weight distribution of the peripheral device may change the perceived weight of the peripheral device as perceived by the user holding the peripheral device. The virtual object in the virtual reality scene corresponds to the peripheral device.

Figure 18B:
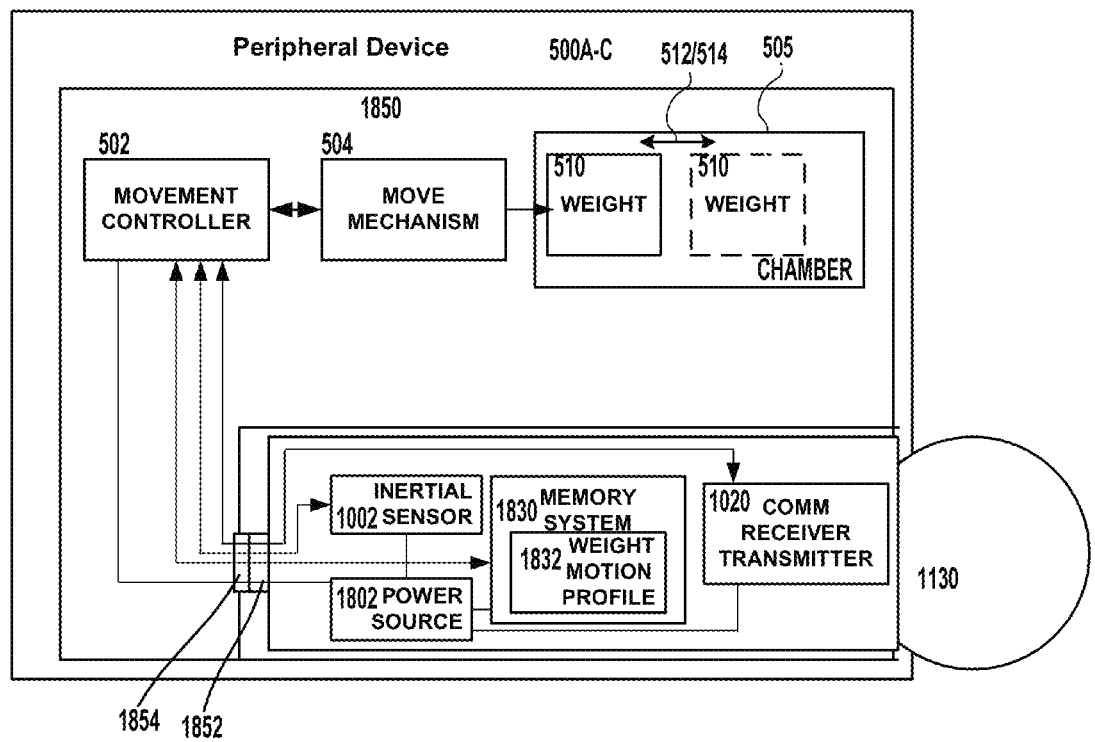
FIG. 18B is a simplified block diagram of a movable weight system in a peripheral device and coupled to a game controller, in accordance with an embodiment of the invention.

FIG. 18B is a simplified block diagram of a movable weight system 1850 in a peripheral device 1100 and coupled to a game controller 1130, in accordance with an embodiment of the invention. The game controller 1130 is coupled to the peripheral device via data ports 1852, 1854 to receive control button inputs from the peripheral device. Coupling the peripheral device 1100 to the game controller 1130 simplifies the peripheral device and thereby reduces costs of the peripheral device 1100.

The movable weight system 1800 may also include a power source 1802 and a weight/motion profile 1832. The power source 1802 may be included in one or more of the peripheral device 1100, the game controller 1130 and/or the computer 106. The communications receiver transmitter 1020, the inertial sensor(s) 1002 and the memory system 1830 may be included in the game controller 1130 and thus are not required to be in the peripheral device 1100. In some embodiments, the game controller 1130 may include the weight movement controller 502.

The weight/motion profile 1832 includes the motion characteristics of a virtual object presented to the user in the virtual environment. By way of example, the weight/motion profile 1832 may include a multi-dimensional graph that characterizes the weight, the directions (s) of movement, rate of movement, and other movement characteristics of the virtual object.

The weight/motion profile 1832 may be initially included in the data, software and hardware forming the virtual environment in the memory system 1820 of the computer 106. When the corresponding virtual object is presented to the user in the virtual environment, the weight/motion profile 1832 is communicated to the movement controller 502. The movement controller 502 uses the weight/motion profile 1832 to move the movable weight 510 to correspond to the movements of the virtual object in the virtual environment. Communicating the weight/motion profile to the movement controller 502 reduces a time delay that may occur if the weight/motion profile 1832 only resided in the computer 106. By way of example, the communicating the weight/motion profile to the movement controller 502 may only be required once during a corresponding virtual reality scene presented to the user in the HMD 102, thereby reducing the data required to be communicated from the computer 106 to the movement controller 502. The computer 106 may communicate one or more weight/motion profile adjustments, that may be simpler and less data than communicating a complete weight/motion profile, during the virtual reality scene presented to the user in the HMD 102.

The movement controller 502, the weight/motion profile 1832 may be embodied in individual modules or combined in a single module. The modules may be implemented in software, firmware, hardware and combinations of hardware, firmware and software.

Figure 19:
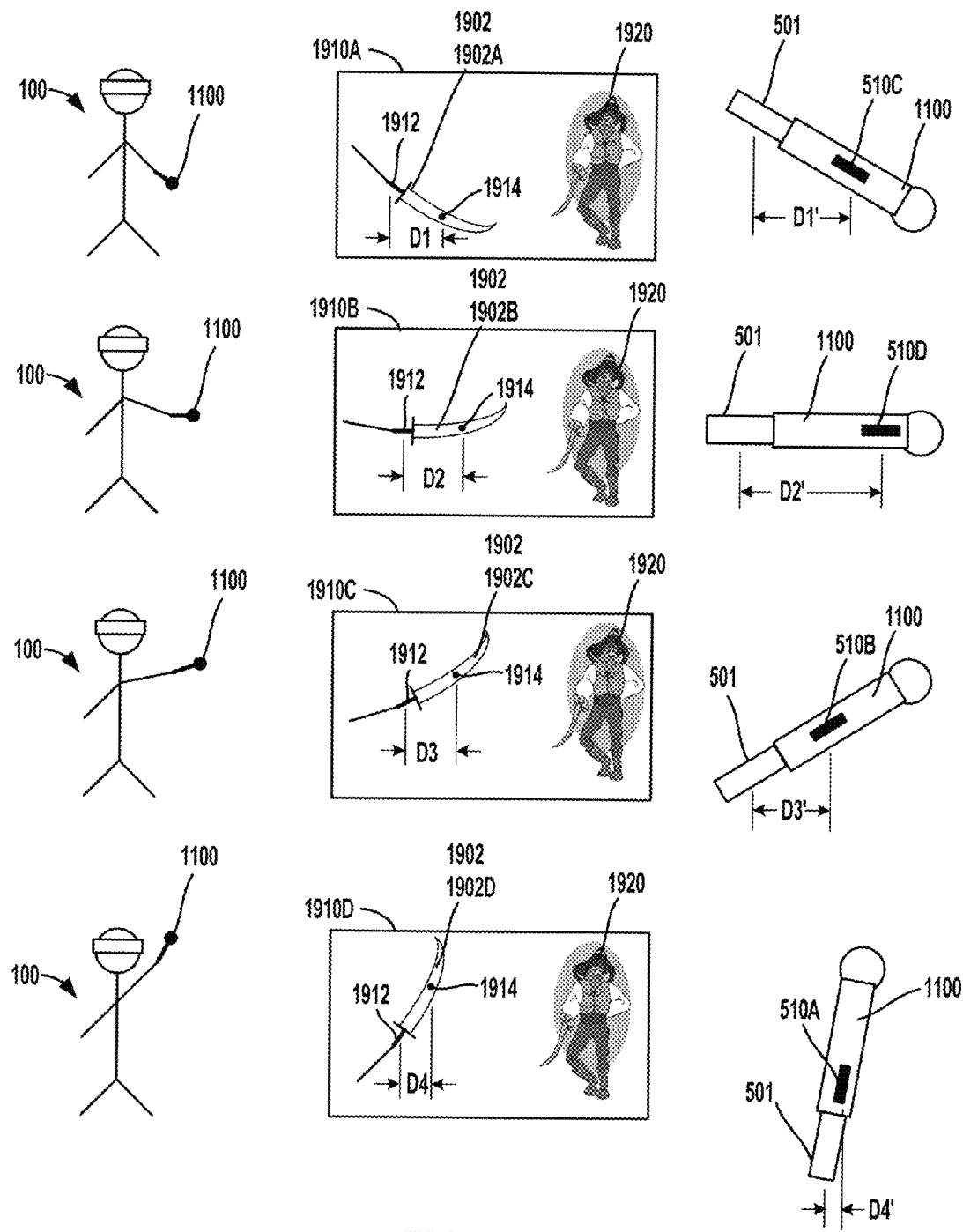
FIG. 19 is an example progression sequence of movement of a virtual object and the handheld peripheral device representing the virtual object, and the movable weight within the peripheral device, in accordance with an embodiment of the invention.

FIG. 19 is an example simplified progression sequence of movement of a virtual object 1902 and the handheld peripheral device 1100 representing the virtual object, and the movable weight within the peripheral device, in accordance with an embodiment of the invention. The user 100 is wearing a HMD 102 and holding the handheld peripheral device 1100. The handheld peripheral device 1100 represents the user's sword 1902 through several scenes 1910A-D of the virtual environment shown in the center column. The user 100 is facing a pirate 1920 in a sword fight in the virtual environment.

The pirate approaches in scene 1910A and the user 100 begins to lift the sword 1902 from a lowered position 1902A. The detailed view of the handheld peripheral device 1100 is shown in the right column. When the user 100 is initially lifting the sword 1902 from the lowered position 1902A, the center of gravity 1914 of the sword is now at a middle distance D1 away from the user's virtual hand grip 1912. The movable weight 510 is at a corresponding middle distance D1' from the user's handgrip 501, in position 510C. The corresponding middle distance D1' from the user's hand grip 501 simulates the weight of the sword having a moderate weight during the initial lift.

In scene 1910B, the user raises the sword 1902 to a more horizontal orientation 1902B. The horizontal orientation 1902B places the center of gravity 1914 of the sword 1902 at a maximum distance D2 away from the user's virtual hand grip 1912. The movable weight 510 shifts to position 510D, at a corresponding maximum distance D2' from the user's hand grip 501. The maximum distance D2' from the user's hand grip 501 increases the leverage of the movable weight 510 on the user's hand grip. The increased leverage of the movable weight 510 simulates the heavy weight of the sword 1902 as the center of mass 1914 of the sword is now at a maximum distance D2 away from the user's virtual hand grip 1912.

In scene 1910C, the user raises the sword 1902 higher than horizontal orientation 1902C. The higher than horizontal orientation 1902C places the places the center of gravity 1914 of the sword 1902 at a medium distance D1 away from the user's virtual hand grip 1912.

The movable weight 510 shifts to a corresponding medium distance D1' in position 510B. The medium distance D3' from the user's hand grip 501 slightly decreases the leverage of the movable weight 510 on the user's hand grip. The decrease in leverage simulates a reduced feeling of the weight of the sword 1902 as the center of gravity 1914 of the sword is now at a medium distance D3 away from the user's virtual hand grip 1912.

In scene 1910D, the user raises the sword 1902 to a highest orientation 1902D. The highest orientation 1902D places the places the center of gravity 1914 of the sword 1902 at a minimum distance D4 away from the user's virtual hand grip 1912. The movable weight 510 shifts to a corresponding minimum distance D4' in position 510D. The minimal distance D4' from the user's hand grip 501 minimizes the leverage of the movable weight 510 on the user's hand grip. The decrease in leverage simulates a further reduced feeling of the weight of the sword 1902 as the center of gravity 1914 of the sword is now at a medium distance D4 away from the user's virtual hand grip 1912.

Figure 20:
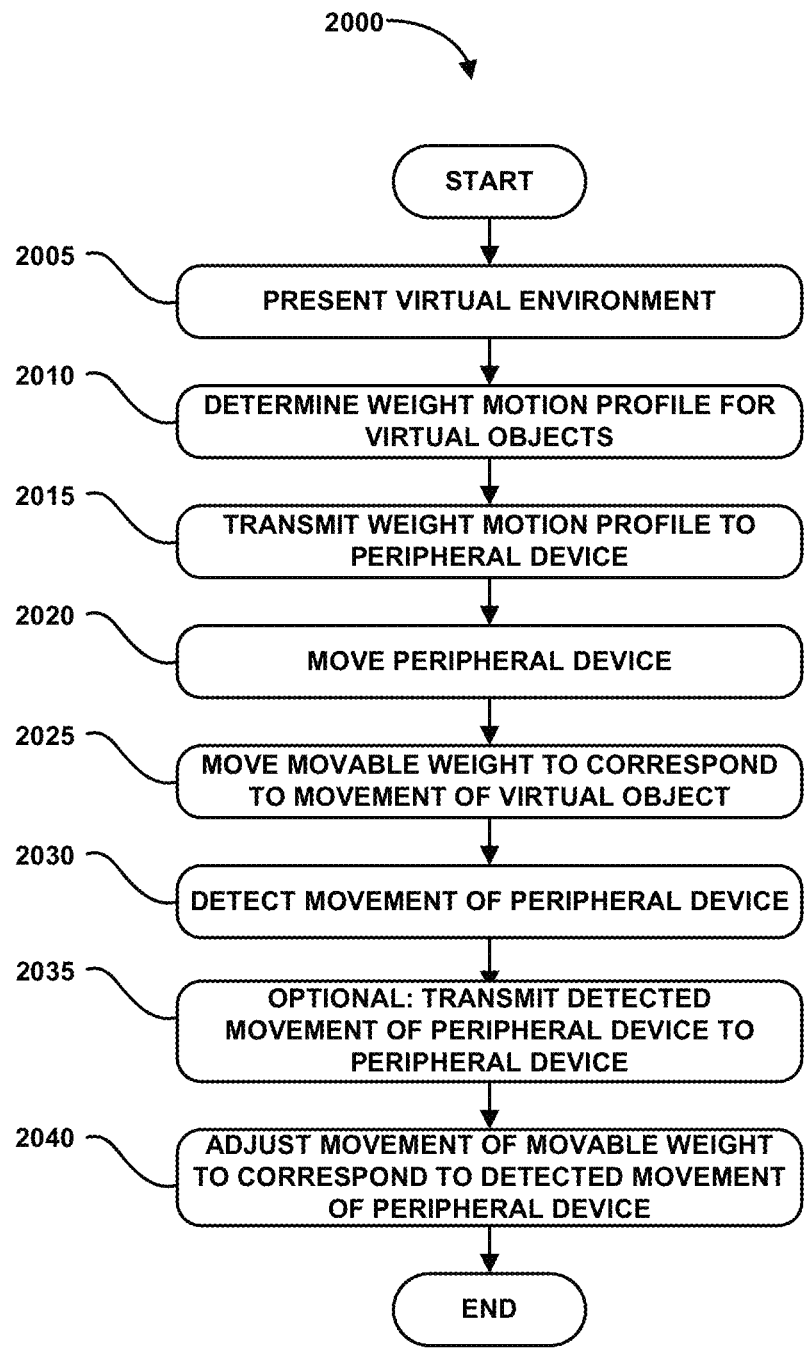
FIG. 20 is a flowchart diagram that illustrates the method operations performed in simulating a varying weight of a virtual object, in accordance with an embodiment of the invention.

FIG. 20 is a flowchart diagram that illustrates the method operations 2000 performed in simulating a varying weight of a virtual object, in accordance with an embodiment of the invention. In an operation 2005, a virtual environment is presented to a user. The virtual environment may be presented through a HMD 102. The virtual environment includes virtual objects that the user may interact with e.g., when presented in the HMD 102. By way of example, the user may lift, move, throw, etc. the virtual objects presented in the virtual environment.

In an operation 2010, a weight/motion profile for each of the virtual objects is determined. The weight/motion profile may be determined as part of the development of the virtual environment. The weight/motion profile may also include one or more adjustments to correspond to the current instance of the virtual object, the virtual environment and the user. By way of example, the virtual object may be a sword. The user may select from multiple types of swords e.g., a rapier, a cutlass, a two-handed broad sword, etc. Each of the different types of swords may have a generally similar but not identical weight/motion profile. Further, additional factors such as the user's virtual armor and the user's physical size may result in adjustments to the weight/motion profile.

In an operation 2015, the weight/motion profile is transmitted to a handheld peripheral device. The handheld peripheral device includes a movable weight 510, as described above. The handheld peripheral device will represent the user's virtual sword. The weight/motion profile may be stored in a memory in the peripheral device for the weight movement controller 502 to use during the simulation of movement and weight of the virtual sword.

In an operation 2020, the handheld peripheral device is moved and in an operation 2025, a position of the movable weight in the handheld peripheral device is adjusted to correspond to a movement of the virtual sword in the virtual environment. The movement of the user's virtual sword 1902 as described in FIG. 19 above provides an example of the movement of the virtual sword and the corresponding movement of the movable weight 510.

In an operation 2030, the motion of the handheld peripheral device is detected by one or more sensors in the handheld peripheral device. The sensors may include one or more of an inertial sensor, an accelerometer, a magnetometer and a gyroscope. The motion of the handheld peripheral device may additionally or alternatively be detected and a tracking signal generated from a tracking system external from the peripheral device, e.g., the camera system 108 described in FIG. 1 et seq. above.

In an operation 2035, if necessary, the detected motion of the handheld peripheral device is transmitted to the weight movement controller 502 in the handheld peripheral device. The motion of the handheld peripheral device that is detected by the camera 108, above could be transmitted to the handheld peripheral device. Motion of the handheld peripheral device detected by the sensors 1002 internal to the handheld peripheral device would be received by the weight movement controller.

The weight movement controller 502 adjusts the weight/motion profile and/or the movement of the movable weight to correspond to the detected motion of the handheld peripheral device, in an operation 2040. The adjustment of the weight/motion profile and/or the movement of the movable weight to correspond to the detected motion of the handheld peripheral device may include interactions of the virtual object with another virtual object in the virtual environment. By way of example, the user's virtual sword may impact the pirate's sword in a sword fight. The weight movement controller would adjust the position, type of movement and speed of the movement of the movable weight 510 to simulate the physics, e.g., weight shift, momentum and impact, of the user's sword 1902 and the pirate's sword.

Continued operation of the movement of the user's virtual sword continues in operations 2025-2040 as described above. When the handheld peripheral device is no longer moved the method operations can end.

Figure 21:
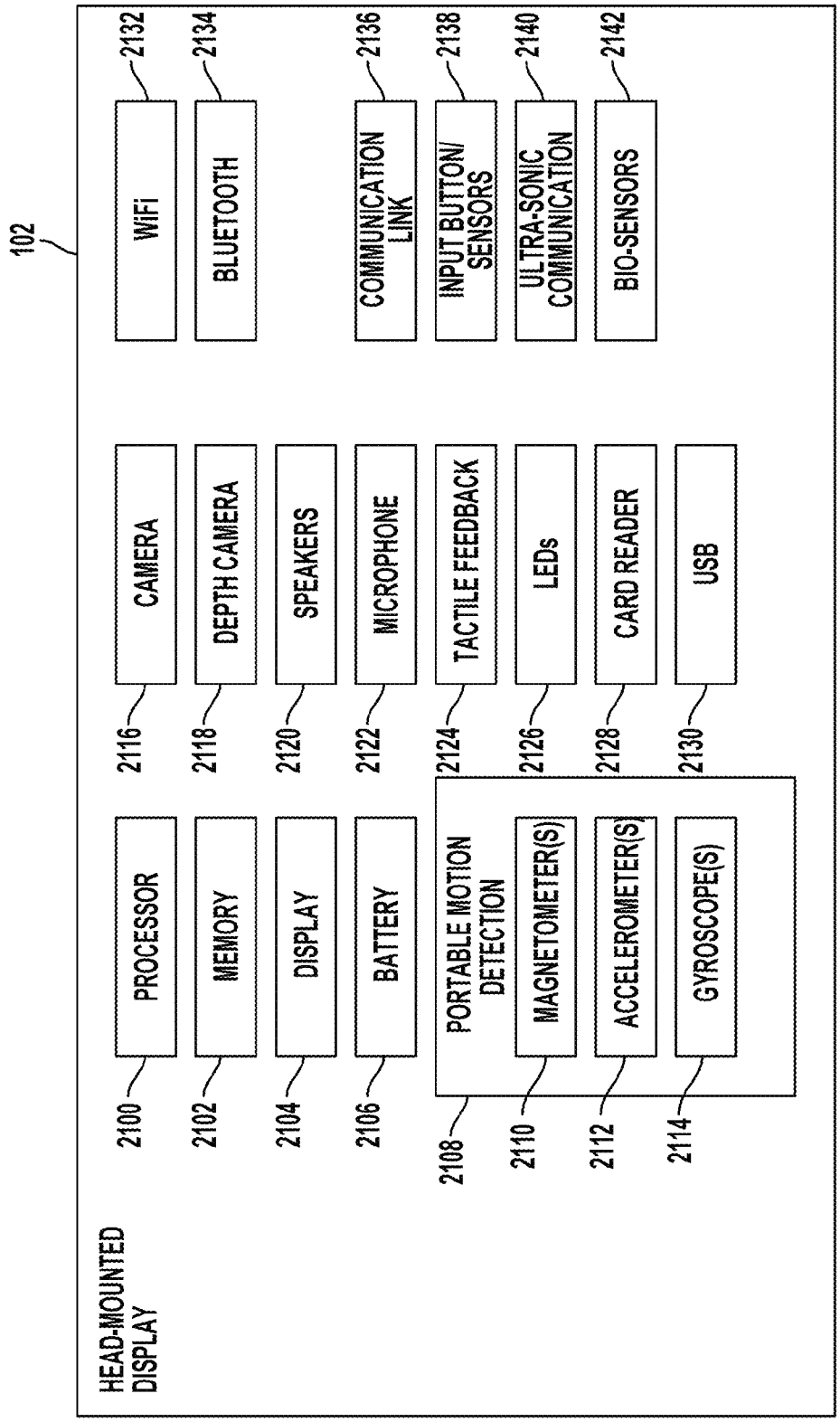
FIG. 21 is a diagram illustrating example components of a head-mounted display 102, in accordance with an embodiment of the invention.

With reference to FIG. 21, a diagram is shown illustrating example components of a head-mounted display 102, in accordance with an embodiment of the invention. It should be understood that more or less components may be included or excluded from the HMD 102, depending on the configuration and functions enabled. The head-mounted display 102 may include a processor 2100 for executing program instructions. A memory 2102 is provided for storage purposes, and may include both volatile and non-volatile memory. A display 2104 is included which provides a visual interface that a user may view.

The display 2104 may be defined by one single display, or in the form of a separate display screen for each eye. When two display screens are provided, it is possible to provide left-eye and right-eye video content separately. Separate presentation of video content to each eye, for example, may provide for better immersive control of three-dimensional (3D) content. As described above, in one embodiment, the second screen 107 is provided with second screen content of the HMD 102 by using the output for one eye, and then formatting the content for display in a 2D format. The one eye, in one embodiment, may be the left-eye video feed, but in other embodiments it may be the right-eye video feed.

A battery 2106 may be provided as a power source for the head-mounted display 102. In other embodiments, the power source may include an outlet connection to power. In other embodiments, an outlet connection to power and a battery 2106 may be provided. A motion detection module 2108 may include any of various kinds of motion sensitive hardware, such as a magnetometer 2110, an accelerometer 2112, and a gyroscope 2114.

An accelerometer 2112 is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers 2112 are used to provide the direction of gravity, which gives an absolute reference for two angles (world-space pitch and world-space roll).

A magnetometer 2110 measures the strength and direction of the magnetic field in the vicinity of the head-mounted display. In one embodiment, three magnetometers 2110 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp may be calibrated using information from other sensors such as the gyroscope or the camera. In one embodiment, accelerometer 2112 is used together with magnetometer 2110 to obtain the inclination and azimuth of the head-mounted display 102.

A gyroscope 2114 is a device for measuring or maintaining orientation, based on the principles of angular momentum. In one embodiment, three gyroscopes 2114 provide information about movement across the respective axis (x, y and z) based on inertial sensing. The gyroscopes help in detecting fast rotations. However, the gyroscopes may drift overtime without the existence of an absolute reference. This requires resetting the gyroscopes periodically, which may be done using other available information, such as positional/orientation determination based on visual tracking of an object, accelerometer, magnetometer, etc.

A camera 2116 is provided for capturing images and image streams of a real environment. More than one camera (optionally) may be included in the HMD 102, including a camera that is rear-facing (directed away from a user when the user is viewing the display of the HMD 102), and a camera that is front-facing (directed towards the user when the user is viewing the display of the HMD 102). Additionally, a depth camera 2118 may be included in the HMD 102 for sensing depth information of objects in a real environment.

The HMD 102 includes speakers 2120 for providing audio output. Also, a microphone 2122 may be included for capturing audio from the real environment, including sounds from the ambient environment, speech made by the user, etc. The HMD 102 includes tactile feedback module 2124 for providing tactile feedback to the user. In one embodiment, the tactile feedback module 2124 is capable of causing movement and/or vibration of the HMD 102 so as to provide tactile feedback to the user.

LEDs 2126 are provided as visual indicators of statuses of the head-mounted display 102. For example, an LED may indicate battery level, power on, etc. A card reader 2128 is provided to enable the head-mounted display 102 to read and write information to and from a memory card. A USB interface 2130 is included as one example of an interface for enabling connection of handheld peripheral devices, or connection to other devices, such as other portable devices, computers, etc. In various embodiments of the HMD 102, any of various kinds of interfaces may be included to enable greater connectivity of the HMD 102.

A WiFi module 2132 may be included for enabling connection to the Internet via wireless networking technologies. Also, the HMD 102 may include a Bluetooth module 2134 for enabling wireless connection to other devices. A communications link 2136 may also be included for connection to other devices. In one embodiment, the communications link 2136 utilizes infrared transmission for wireless communication. In other embodiments, the communications link 2136 may utilize any of various wireless or wired transmission protocols for communication with other devices.

Input buttons/sensors 2138 are included to provide an input interface for the user. Any of various kinds of input interfaces may be included, such as buttons, gestures, touchpad, joystick, trackball, etc. An ultra-sonic communication module 2140 may be included in HMD 102 for facilitating communication with other devices via ultra-sonic technologies.

Bio-sensors 2142 are included to enable detection of physiological data from a user. In one embodiment, the bio-sensors 2142 include one or more dry electrodes for detecting bio-electric signals of the user through the user's skin, voice detection, eye retina detection to identify users/profiles, etc.

The foregoing components of HMD 102 have been described as merely exemplary components that may be included in HMD 102. In various embodiments of the invention, the HMD 102 may or may not include some of the various aforementioned components. Embodiments of the HMD 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous users (e.g., P1, P2, . . . Pn). Each of these users may receive or share a video stream, or a single video stream may include regions of a frame generated specifically for each player, e.g., generated based on each user's point of view. Any number of clients may be local (e.g., co-located) or are geographically dispersed. The number of clients included in a game system may vary widely from one or two to thousands, tens of thousands, or more. As used herein, the term "game player" or "user" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with the video server system to deliver a game viewed through the HMD. In one embodiment, the game console receives the video stream from the video server system and the game console forwards the video stream, or updates to the video stream, to the HMD and/or television for rendering.

Still further, the HMD may be used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content may be rendered so long as it may be viewed in the HMD or rendered to a screen or screen of the HMD.

Clients may, but are not required to, further include systems configured for modifying received video. For example, a client may be configured to perform further rendering, to overlay one video image on another video image, to crop a video image, and/or the like. For example, clients may be configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source may include rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic may produce raw video that is encoded. For example, the raw video may be encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client may be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 22:
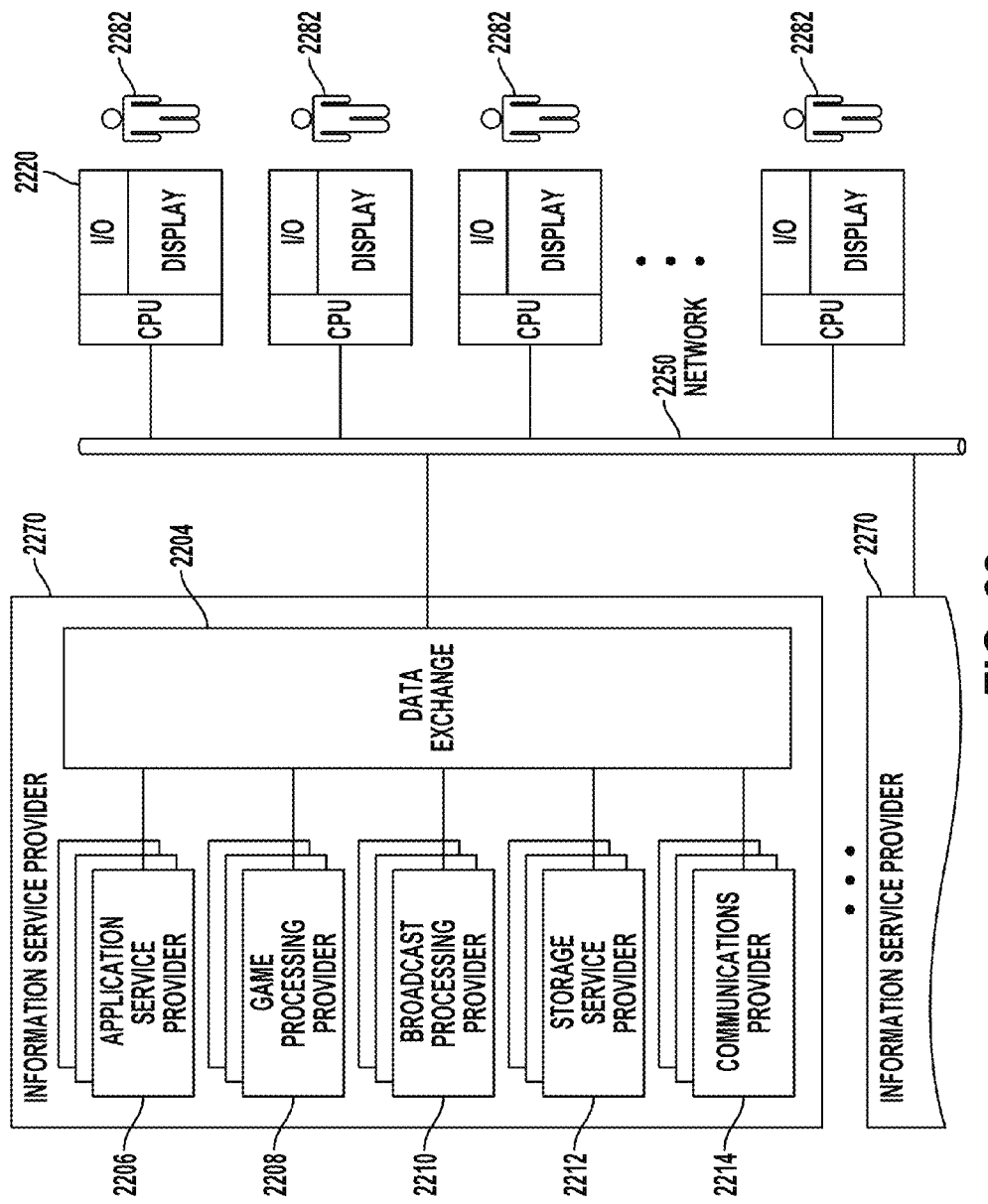
FIG. 22 illustrates an embodiment of an Information Service Provider architecture, in accordance with an embodiment of the invention.

FIG. 22 illustrates an embodiment of an Information Service Provider architecture. Information Service Providers (ISP) 2270 delivers a multitude of information services to users 2282 geographically dispersed and connected via network 2250. An ISP may deliver just one type of service, such as stock price updates, or a variety of services such as broadcast media, news, sports, gaming, etc. Additionally, the services offered by each ISP are dynamic, that is, services may be added or taken away at any point in time. Thus, the ISP providing a particular type of service to a particular individual may change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 2270 includes Application Service Provider (ASP) 2206, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing may be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 2270 includes a Game Processing Server (GPS) 2208 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 2210 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content may reach almost any country in the world.

Storage Service Provider (SSP) 2212 provides computer storage space and related management services. SSPs also offer periodic backup and archiving. By offering storage as a service, users may order more storage as required. Another major advantage is that SSPs include backup services and users will not lose all their data if their computers' hard drives fail. Further, a plurality of SSPs may have total or partial copies of the user data, allowing users to access data in an efficient way independently of where the user is located or the device being used to access the data. For example, a user may access personal files in the home computer, as well as in a mobile phone while the user is on the move.

Communications Provider 2214 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider may also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 2204 interconnects the several modules inside ISP 2270 and connects these modules to users 2282 via network 2250. Data Exchange 2204 may cover a small area where all the modules of ISP 2270 are in close proximity, or may cover a large geographic area when the different modules are geographically dispersed. For example, Data Exchange 2204 may include a fast Gigabit Ethernet (or faster) within a cabinet of a data center, or an intercontinental virtual area network (VLAN).

Users 2282 access the remote services with client device 2220, which includes at least a CPU, a display and I/O. The client device may be a PC, a mobile phone, a netbook, tablet, gaming system, a PDA, etc. In one embodiment, ISP 2270 recognizes the type of device used by the client and adjusts the communication method employed. In other cases, client devices use a standard communications method, such as html, to access ISP 2270.

Embodiments of the present invention may be practiced with various computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a wire-based or wireless network.

With the above embodiments in mind, it should be understood that the invention may employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, or the apparatus may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention may also be embodied as computer readable code on a computer readable medium. The computer readable medium is any data storage device that may store data, which may be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium may include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A peripheral device for use in interfacing with a virtual reality scene generated by a computer for presentation on a head mounted display, comprising,
    a housing;
    a weight coupled to the housing, the weight being movable;
    a movement controller for processing instructions for moving the weight, the movement controller receiving the instructions from the computer so that movement of the weight changes a weight distribution for the peripheral device, the changes in the weight distribution are correlated to movements of a virtual object in the virtual reality scene as presented on the head mounted display; and
    a move mechanism for causing the weight to move based on the instructions received from the movement controller, the move mechanism is configured apply a rate of movement of the weight based on the instructions processed by the movement controller, the rate of movement of the weight is modified based on a weight adjusting profile that is corresponded to the virtual object in the virtual reality scene.

2. The peripheral device of claim 1, wherein the housing includes a chamber and the movable weight is disposed in the chamber, the weight being movable within the chamber.

3. The peripheral device of claim 1, wherein the move mechanism includes at least one of:
    a compressed gas;
    an electric motor;
    a linear motor;
    an electromagnet;
    a pump;
    a spring;
    one or more memory metals;
    one or more electroactive polymers; or
    one or more phase changing materials.

4. The peripheral device of claim 1, wherein the instructions for moving the weight includes at least one of:
    a linear direction of movement of the virtual object;
    a rotational direction of movement of the virtual object; or
    an amount of movement of the virtual object.

5. The peripheral device of claim 1, wherein the movable weight is a fluid.

6. The peripheral device of claim 1, further comprising at least one inertial sensor coupled to the movement controller.

7. The peripheral device of claim 1, wherein moving the movable weight includes moving the movable weight in at least one of:
    a longitudinal direction along at least a portion of a length of the handheld peripheral device;
    a lateral direction along at least a portion of a width of the handheld peripheral device;
    an oscillating motion;
    a rotating motion; or
    along a curved direction.

8. The peripheral device of claim 1, wherein the movable weight is disposed externally from the housing of the handheld peripheral device.

9. Method of simulating weight of a virtual object in a virtual environment presented in a head mounted display, comprising:

receiving a weight moving instruction in a handheld peripheral device, the weight moving instruction corresponding to at least one of a plurality of weight characteristics and a plurality of movement characteristics of the virtual object presented in the virtual environment, the handheld peripheral device representing the virtual object, the handheld peripheral device including a movable weight; and adjusting a position of the movable weight in the handheld peripheral device to correspond to a movement of the virtual object in the virtual environment, the weight moving instructions are processed based on a weight adjusting profile that is corresponded to the virtual object.

10. The method of claim 9, further comprising storing the weight adjusting profile in the handheld peripheral device.

11. The method of claim 9, wherein the weight adjusting profile includes at least one of:
 a rate of movement of the virtual object;
 at least one linear direction of movement of the virtual object;
 at least one rotational direction of movement of the virtual object; or
 an amount of movement of the virtual object.

12. The method of claim 9, wherein the handheld peripheral device includes:
 a move mechanism capable of moving the movable weight; and
 a movement controller coupled to the move mechanism.

13. The method of claim 12, wherein the handheld peripheral device further includes at least one inertial sensor coupled to the movement controller.

14. The method of claim 13, further comprising comparing an inertial signal output from the inertial sensor to the weight adjusting profile to produce a weight adjustment difference signal and adjusting the position of the movable weight to correspond to the weight adjustment difference signal.

15. The method of claim 12, wherein the move mechanism includes at least one of:
 a compressed gas;
 an electric motor;
 a linear motor;
 an electromagnet;
 a pump;
 a spring;
 one or more memory metals;
 one or more electroactive polymers; or
 one or more phase changing materials.

16. The method of claim 9, wherein the movable weight is a fluid.

17. The method of claim 9, wherein adjusting the position of the movable weight includes moving the movable weight in at least one of:
 a longitudinal direction along at least a portion of a length of the handheld peripheral device;
 a lateral direction along at least a portion of a width of the handheld peripheral device;
 an oscillating motion;
 a rotating motion; or
 along a curved direction.

18. The method of claim 9, wherein the weight moving instruction is sent from a computing device.

19. The method of claim 9, moving the weight changes a weight distribution of the peripheral device.

* * * * *